US012690110B2

(12) United States Patent (10) Patent No.: US 12,690,110 B2
Yamaguchi et al. (45) Date of Patent: Jul. 21, 2026

(54) ILLUMINATION DEVICE

(71) Applicant: Japan Display Inc., Tokyo (JP)

(72) Inventors: Kazunori Yamaguchi, Tokyo (JP);
Hiroyuki Wakana, Tokyo (JP);
Takayuki Imai, Tokyo (JP)

(73) Assignee: Japan Display Inc., Tokyo (JP)

( * ) Notice: Subject to any disclaimer, the term of this
patent is extended or adjusted under 35
U.S.C. 154(b) by 180 days.

(21) Appl. No.: 18/785,955

(22) Filed: Jul. 26, 2024

(65) Prior Publication Data

US 2024/0389209 A1 Nov. 21, 2024

Related U.S. Application Data

(63) Continuation of application No.
PCT/JP2022/047413, filed on Dec. 22, 2022.

(30) Foreign Application Priority Data

Jan. 27, 2022 (JP) ................................. 2022-011280

(51) Int. Cl.
*H05B 47/105* (2020.01)
*F21V 9/40* (2018.01)
(Continued)

(52) U.S. Cl.
CPC ............. *H05B 47/105* (2020.01); *F21V 9/40*
(2018.02); *F21V 33/0052* (2013.01);
(Continued)

(58) Field of Classification Search
CPC ...... F21V 9/40; F21V 33/0052; G02F 1/1347;
H05B 45/10; H05B 47/105; H05B 47/11;
H05B 47/19; H05B 47/1965; Y02B 20/40
See application file for complete search history.

(56) References Cited

U.S. PATENT DOCUMENTS 9,513,487 B2 * 12/2016 Shinkai .................. G02B 30/31
10,197,849 B2 * 2/2019 Shinkai ............. G02F 1/134309
(Continued)

FOREIGN PATENT DOCUMENTS

JP H02-065001 A 3/1990
JP 2012227058 A * 11/2012
JP 2013041132 A * 2/2013

OTHER PUBLICATIONS

Machine Translation of JP2012227058A (Year: 2012).*
(Continued)

*Primary Examiner* — Raymond R Chai
(74) *Attorney, Agent, or Firm* — K&L Gates LLP

(57) ABSTRACT

An illumination device includes a light source, a light adjustment device configured to control a light distribution angle of light emitted from the light source, and a controller configured to control the light source and the light adjustment device. The controller includes a storage configured to hold information indicating a correspondence relation between an irradiation area calculated based on a light distribution angle command value and an irradiation area ratio to a predetermined reference irradiation area, a light emission intensity generator configured to generate light emission intensity of the light source based on the information, and a driver configured to drive the light source based on the light emission intensity.

7 Claims, 29 Drawing Sheets

(51) Int. Cl.
    *F21V 33/00*           (2006.01)
    *G02F 1/1347*       (2006.01)
    *H05B 47/175*      (2020.01)
    *H05B 47/19*        (2020.01)

(52) U.S. Cl.
    CPC ........... *G02F 1/1347* (2013.01); *H05B 47/19*
            (2020.01); *H05B 47/1965* (2024.01)

(56)             References Cited

U.S. PATENT DOCUMENTS

| | | | |
|---|---|---|---|
| 10,522,095 B2 * | 12/2019 | Yata ...................... | G09G 3/3208 |
| 10,714,206 B2 * | 7/2020 | Kondo ............... | G11C 29/1201 |
| 2016/0320664 A1 * | 11/2016 | Kang ................ | G02F 1/133621 |
| 2024/0302724 A1 * | 9/2024 | Wu ........................ | G03B 21/00 |

OTHER PUBLICATIONS

Machine Translation of JP2013041332A (Year: 2013).*
Search report issued in related International Patent Application No. PCT/JP2022/047413 mailed on Feb. 21, 2023, and English translation of same. 5 pages.
Written Opinion issued in related International Patent Application No. PCT/JP2022/047413 mailed on Feb. 21, 2023. 3 pages.

* cited by examiner

IRRADIATION
AREA RATIO

140

120

100

80

60

40

20

17.3

4.06

1

0   10   20        40        60        80   90   100

LIGHT
DISTRIBUTION
ANGLE [deg]

$a \propto Ax$ $b \propto Ay$ $AR = \pi \times a \times b$
$\propto Ax \times Ay$

ILLUMINATION DEVICE

CROSS-REFERENCE TO RELATED APPLICATION

This application is a continuation of International Patent Application No. PCT/JP2022/047413 filed on Dec. 22, 2022 which designates the United States, incorporated herein by reference, and which claims the benefit of priority from Japanese Patent Application No. 2022-011280 filed on Jan. 27, 2022, incorporated herein by reference.

BACKGROUND

1. Technical Field

The present disclosure relates to an illumination device.

2. Description of the Related Art

In a conventional illumination instrument, a light source such as an LED is combined with a thin lens provided with a prism pattern, and the distance between the light source and the thin lens is changed to change a light distribution angle. For example, an illumination instrument is disclosed (refer to Japanese Patent Application Laid-open Publication No. H02-65001, for example) in which the front of a transparent light bulb is covered by a liquid crystal light adjustment element, and the transmittance of a liquid crystal layer is changed to switch directly reaching light and scattering light.

For example, a region irradiated with light from an illumination device including a liquid crystal cell can be adjusted by driving the liquid crystal cell to control the light distribution angle of the light. In the illumination device with such an aspect, the light quantity per unit area in the irradiation region of light is different between cases where the irradiation region is relatively large and small. More specifically, in the case where the irradiation area is larger, the light quantity per unit area in the irradiation region is smaller than in the case where the irradiation area is smaller. In other words, in a case where the irradiation area is larger, illuminance in the irradiation region is lower than in a case where the irradiation area is smaller. Thus, to keep relative brightness constant when the light distribution angle is changed, the light emission intensity of a light source needs to be adjusted in accordance with the irradiation area.

The present disclosure is intended to provide an illumination device that can keep relative brightness substantially constant when the light distribution angle is changed.

SUMMARY

An illumination device according to an embodiment of the present disclosure includes a light source, a light adjustment device configured to control a light distribution angle of light emitted from the light source, and a controller configured to control the light source and the light adjustment device. The controller includes a storage configured to hold information indicating a correspondence relation between an irradiation area calculated based on a light distribution angle command value and an irradiation area ratio to a predetermined reference irradiation area, a light emission intensity generator configured to generate light emission intensity of the light source based on the information, and a driver configured to drive the light source based on the light emission intensity.

BRIEF DESCRIPTION OF THE DRAWINGS

FIG. 11 is a diagram illustrating an example of a control block configuration that adjusts first data transmitted to the illumination device in the control device according to the embodiment;

FIG. 24 is a diagram illustrating an example of a control block configuration of an illumination device according to a second embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1A:
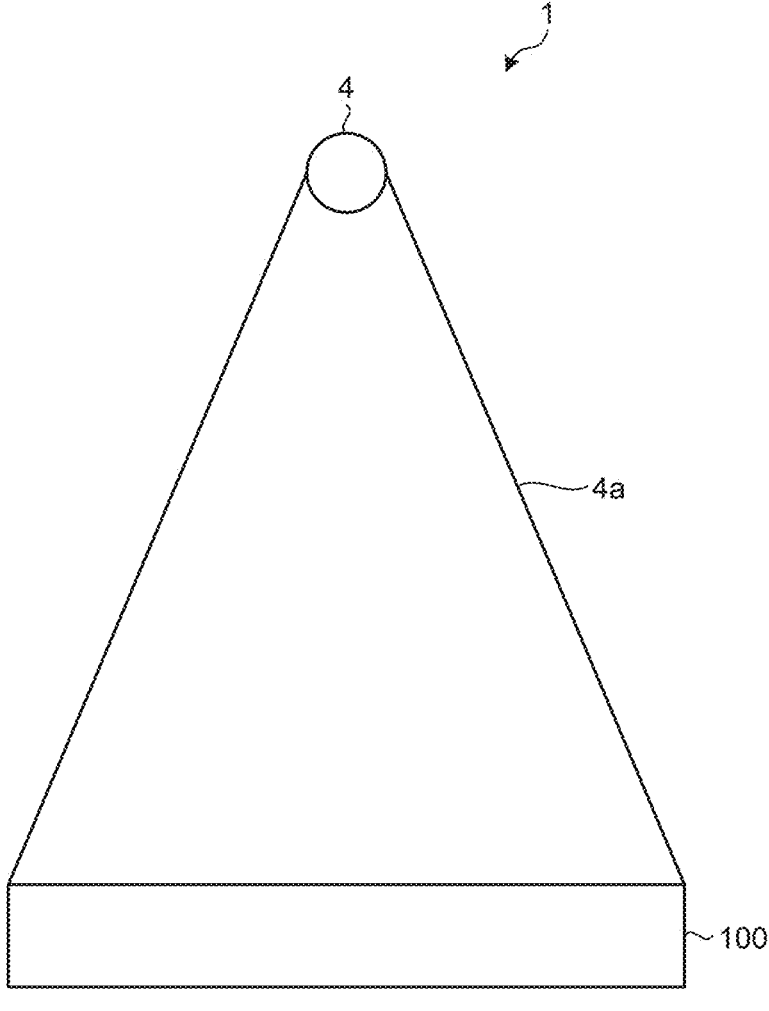
FIG. 1A is a side view illustrating an example of an illumination device according to an embodiment.
Figure 1B:
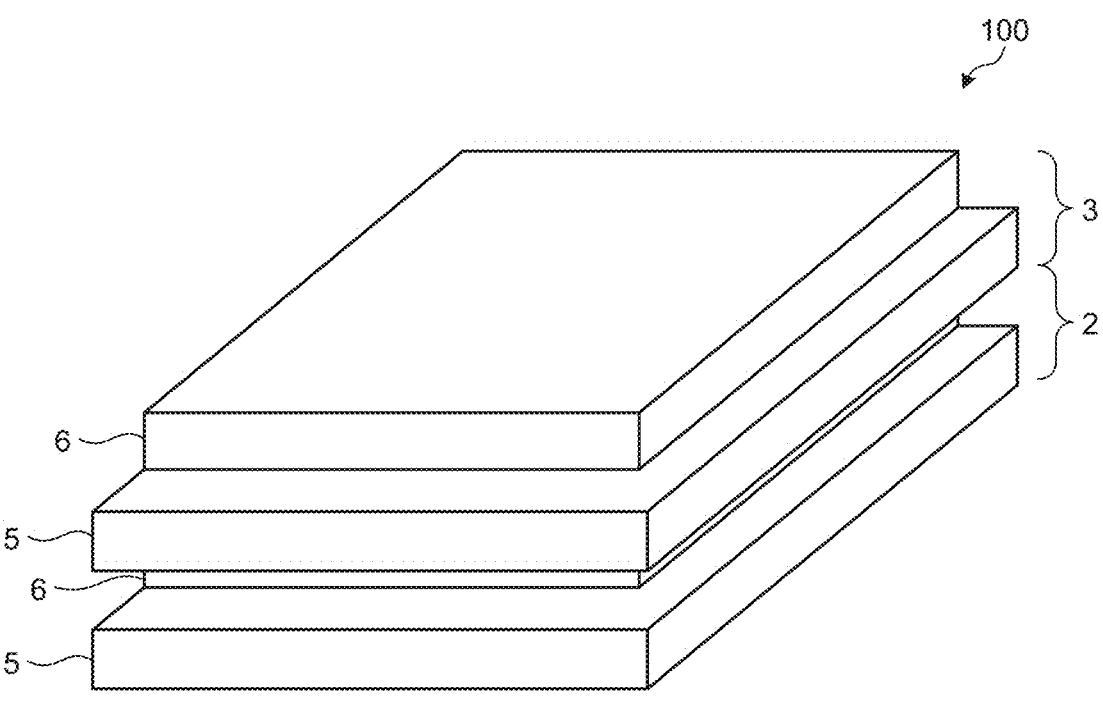
FIG. 1B is a perspective view illustrating an example of a light adjustment device according to the embodiment.

FIG. 1A is a side view illustrating an example of an illumination device according to an embodiment. FIG. 1B is a perspective view illustrating an example of a light adjustment device according to the embodiment. As illustrated in FIG. 1A, an illumination device 1 includes a light source 4, a reflector 4a, and a light adjustment device 100. As illustrated in FIG. 1B, the light adjustment device 100 includes a first liquid crystal cell 2 and a second liquid crystal cell 3.

The light source 4 is constituted by, for example, a light emitting diode (LED). The reflector 4a is a component through which light from the light source 4 is condensed to the light adjustment device 100.

Figure 1B:
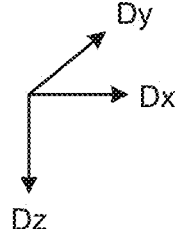

In FIG. 1B, a Dz direction represents the irradiation direction of light from the light source 4 and the reflector 4a. The light adjustment device 100 is constituted by stacking the first liquid crystal cell 2 and the second liquid crystal cell 3 in the Dz direction. In FIG. 1, one direction in a plane parallel to a stacking plane of the first liquid crystal cell 2 and the second liquid crystal cell 3 orthogonal to the Dz direction is defined as a Dx direction, and a direction orthogonal to the Dx direction and the Dz direction is defined as a Dy direction.

The first liquid crystal cell 2 and the second liquid crystal cell 3 have the same configuration. In the present embodiment, the first liquid crystal cell 2 is a liquid crystal cell for p wave polarization. The second liquid crystal cell 3 is a liquid crystal cell for s wave polarization. Note that the first liquid crystal cell 2 may be a liquid crystal cell for s wave polarization, and the second liquid crystal cell 3 may be a liquid crystal cell for p wave polarization. It is only needed that one of the first liquid crystal cell 2 and the second liquid crystal cell 3 is a liquid crystal cell for p wave polarization and the other is a liquid crystal cell for s wave polarization.

Figure 2:
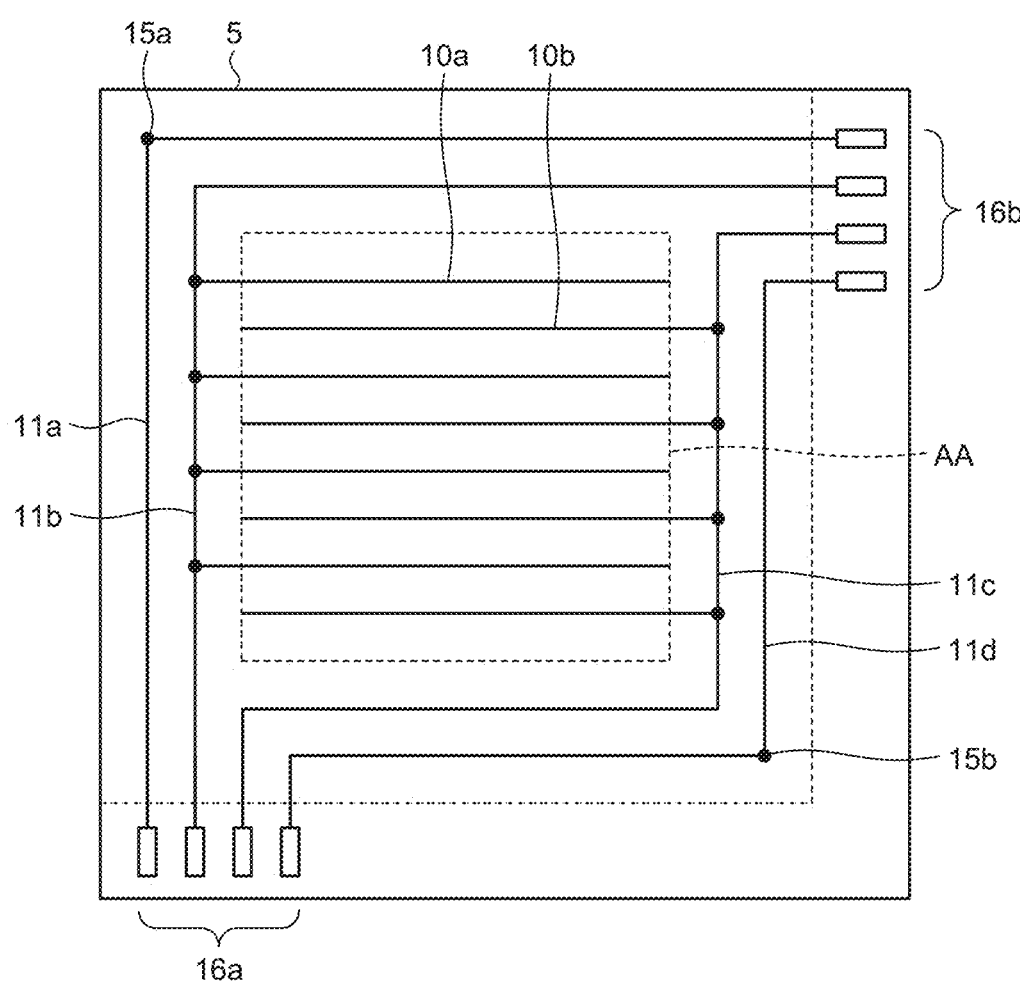
FIG. 2 is a schematic plan view of a first substrate when viewed in a Dz direction.
Figure 2:
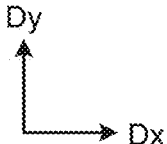
Figure 3:
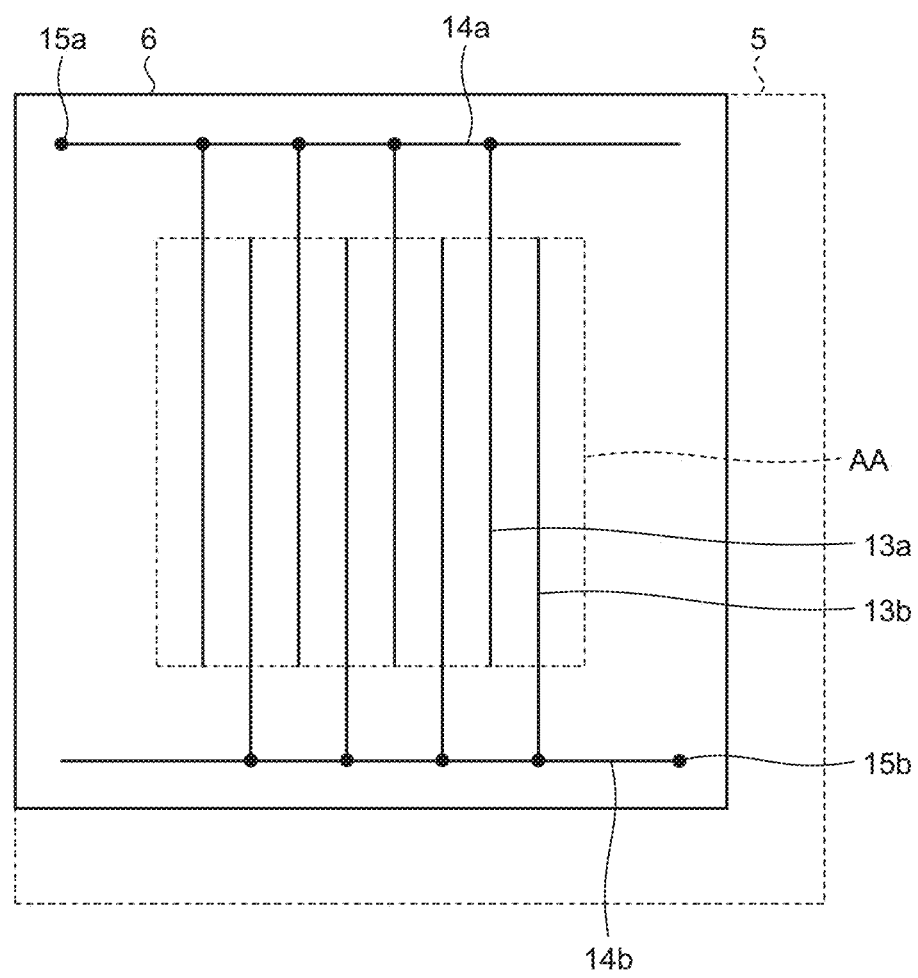
FIG. 3 is a schematic plan view of a second substrate when viewed in the Dz direction.
Figure 3:
Figure 4:
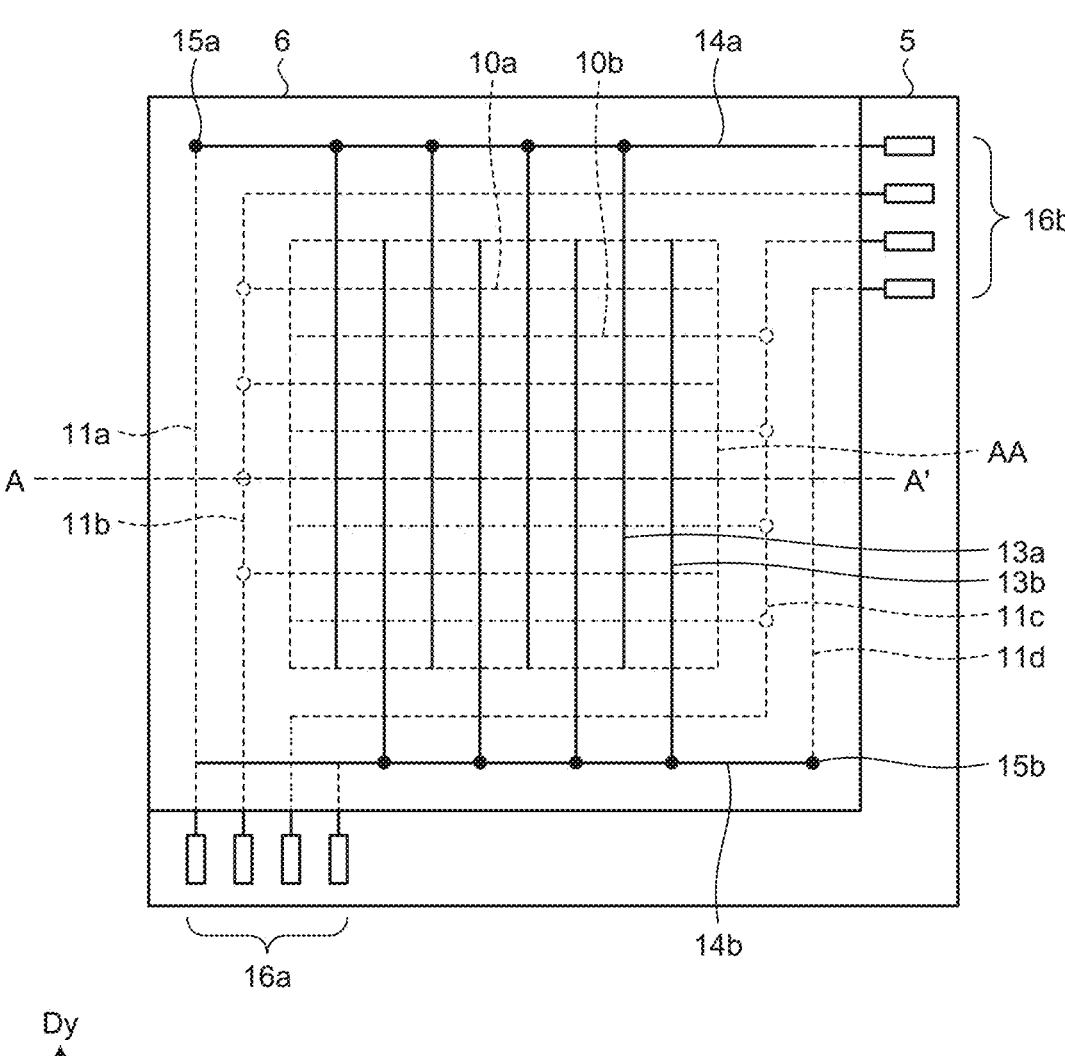
FIG. 4 is a fluoroscopic diagram of a liquid crystal cell in which the first substrate and the second substrate are placed over in the Dz direction.
Figure 4:
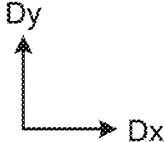
Figure 5:
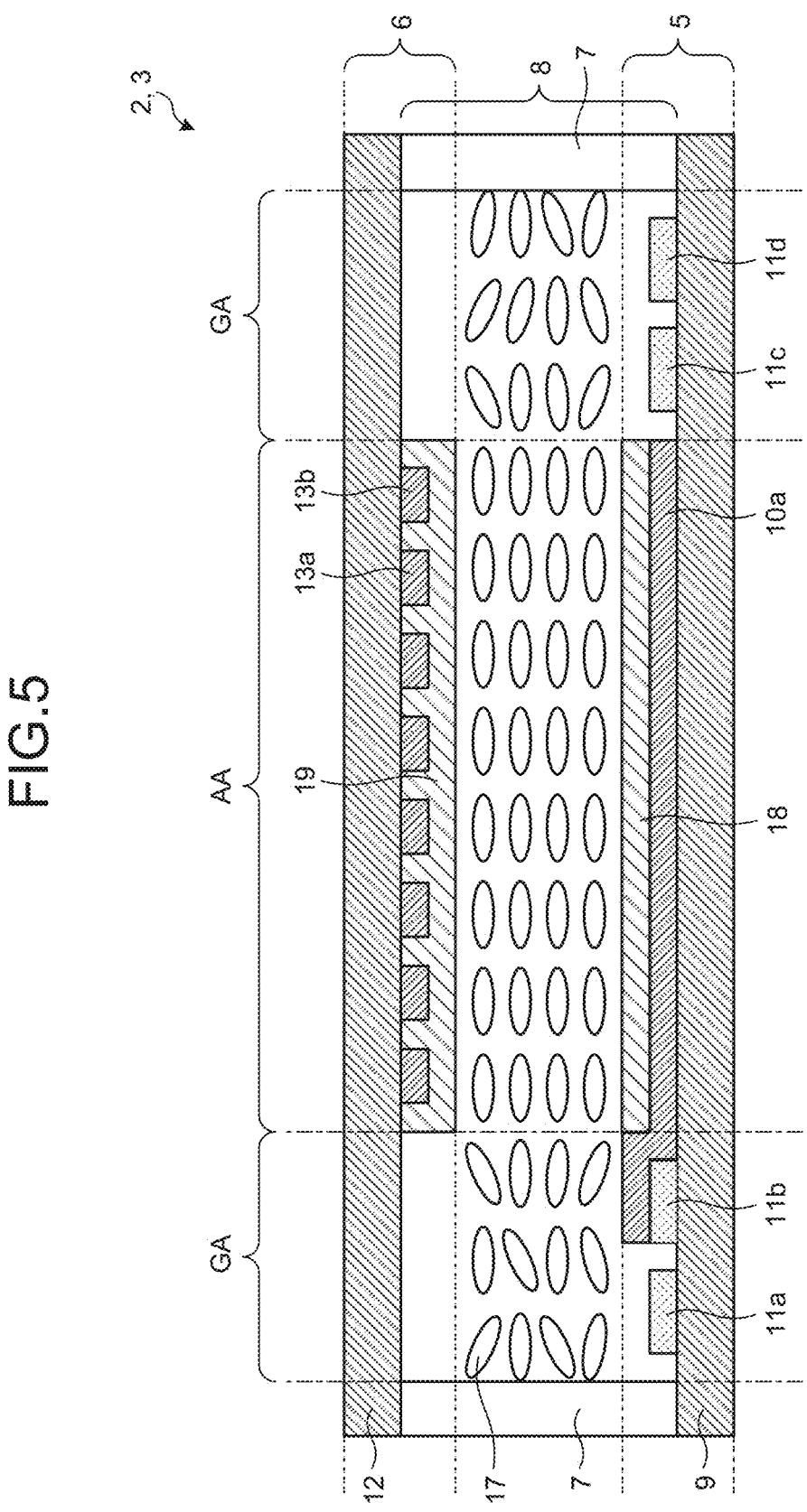
FIG. 5 is a sectional view along line A-A' illustrated in FIG. 4.

The first liquid crystal cell 2 and the second liquid crystal cell 3 each include a first substrate 5 and a second substrate 6. FIG. 2 is a schematic plan view of the first substrate when viewed in the Dz direction. FIG. 3 is a schematic plan view of the second substrate when viewed in the Dz direction. FIG. 4 is a fluoroscopic diagram of a liquid crystal cell in which the first substrate and the second substrate are placed over in the Dz direction. FIG. 5 is a sectional view along line A-A' illustrated in FIG. 4.

As illustrated in FIG. 5, the first liquid crystal cell 2 and the second liquid crystal cell 3 each include a liquid crystal layer 8 having a periphery sealed by a sealing member 7 between the first substrate 5 and the second substrate 6.

The liquid crystal layer 8 modulates light passing through the liquid crystal layer 8 in accordance with the state of electric field. The liquid crystal layer 8 may be, for example, of a horizontal electric field mode such as fringe field switching (FFS), which is a form of in-plane switching (IPS), or may be of a vertical electric field mode. Liquid crystal of various modes such as twisted nematic (TN), vertical alignment (VA), and electrically controlled birefringence (ECB) may be used and is not limited by the kind and configuration of the liquid crystal layer 8.

As illustrated in FIG. 2, a plurality of drive electrodes 10a and 10b, a plurality of metal wires 11a and 11b that supply drive voltage applied to these drive electrodes 10, and a plurality of metal wires 11c and 11d that supply drive voltage applied to a plurality of drive electrodes 13a and 13b (refer to FIG. 3) provided at the second substrate 6 to be described later are provided on the liquid crystal layer 8 side of a base material 9 of the first substrate 5 illustrated in FIG. 5. The metal wires 11a, 11b, 11c, and 11d are provided in a wiring layer of the first substrate 5. The metal wires 11a, 11b, 11c, and 11d are provided at intervals in the wiring layer on the first substrate 5. Hereinafter, the drive electrodes 10a and 10b are simply referred to as "drive electrodes 10" in some cases. In addition, the metal wires 11a, 11b, 11c, and 11d are referred to as "first metal wires 11" in some cases. As illustrated in FIG. 2, the drive electrodes 10 on the first substrate 5 extend in the Dx direction.

As illustrated in FIG. 3, the drive electrodes 13a and 13b and a plurality of metal wires 14a and 14b that supply drive voltage applied to these drive electrodes 13 are provided on the liquid crystal layer 8 side of a base material 12 of the second substrate 6 illustrated in FIG. 5. The metal wires 14a and 14b are provided in a wiring layer of the second substrate 6. The metal wires 14a and 14b are provided at intervals in the wiring layer on the second substrate 6. Hereinafter, the drive electrodes 13a and 13b are simply referred to as "drive electrodes 13" in some cases. In addition, the metal wires 14a and 14b are referred to as "second metal wires 14" in some cases. As illustrated in FIG. 3, the drive electrodes 13 on the second substrate 6 extend in the Dy direction.

The drive electrodes 10 and 13 are translucent electrodes formed of a translucent conductive material (translucent conductive oxide) such as indium tin oxide (ITO). The first substrate 5 and the second substrate 6 are translucent substrates of glass, resin, or the like. The first metal wires 11 and the second metal wires 14 are formed of at least one metallic material among aluminum (Al), copper (Cu), silver (Ag), molybdenum (Mo), and alloy thereof. The first metal wires 11 and the second metal wires 14 may be each formed of one or more of these metallic materials as a multilayered body of a plurality of layers. The at least one metallic material among aluminum (Al), copper (Cu), silver (Ag), molybdenum (Mo), and alloy thereof has a resistance lower than that of translucent conductive oxide such as ITO.

The metal wire 11a of the first substrate 5 and the metal wire 14a of the second substrate 6 are coupled to each other through a conduction part 15a such as a via. The metal wire 11d of the first substrate 5 and the metal wire 14b of the second substrate 6 are coupled to each other through a conduction part 15b such as a via.

Coupling (Flex-on-Board) terminal parts 16a and 16b coupled to non-illustrated flexible printed circuits (FPC) are provided in a region on the first substrate 5, which does not overlap the second substrate 6 in the Dz direction. The coupling terminal parts 16a and 16b each include four coupling terminals corresponding to the metal wires 11a, 11b, 11c, and 11d.

The coupling terminal parts 16a and 16b are provided in the wiring layer of the first substrate 5. Drive voltage applied to the drive electrodes 10a and 10b on the first substrate 5 and the drive electrodes 13a and 13b on the second substrate 6 is supplied from the FPC coupled to the coupling terminal part 16a or 16b to the first liquid crystal cell 2 and the second liquid crystal cell 3. Hereinafter, the coupling terminal parts 16a and 16b are simply referred to as "coupling terminal parts 16" in some cases.

As illustrated in FIG. 4, in the first liquid crystal cell 2 and the second liquid crystal cell 3, the first substrate 5 overlaps the second substrate 6 in the Dz direction (light irradiation direction), and the drive electrodes 10 on the first substrate 5 intersect the drive electrodes 13 on the second substrate 6 when viewed in the Dz direction. In the first liquid crystal cell 2 and the second liquid crystal cell 3 thus configured, the orientation direction of liquid crystal molecules 17 in the liquid crystal layer 8 can be controlled by supplying drive voltage to each of the drive electrodes 10 on the first substrate 5 and the drive electrodes 13 on the second substrate 6. A region in which the orientation direction of the liquid crystal molecules 17 in the liquid crystal layer 8 be can controlled is referred to as a "light modulation region AA". Light transmitting through the light modulation region AA of each of the first liquid crystal cell 2 and the second liquid crystal cell 3 can be controlled with change of refractive index distribution of the liquid crystal layer 8 in the light modulation region AA. A region outside the light modulation region AA where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10a) are covered by an alignment film 18 in the light modulation region of the first substrate 5. In addition, the drive electrodes 13 (in FIG. 5, the drive electrodes 13a and 13b) are covered by an alignment film 19 in the light modulation region of the second substrate 6. The alignment film 18 and the alignment film 19 have different rubbing directions.

Figure 6A:
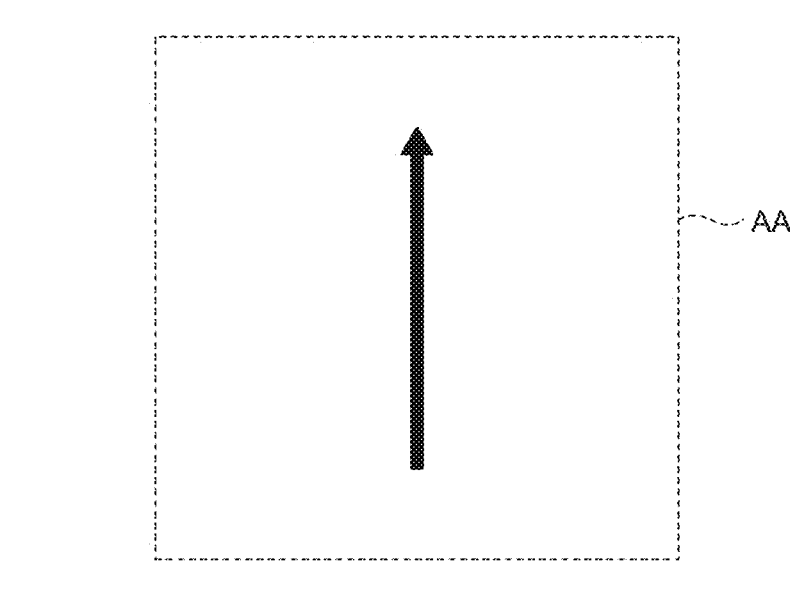
FIG. 6A is a diagram illustrating a rubbing direction of an alignment film of the first substrate.
Figure 6B:
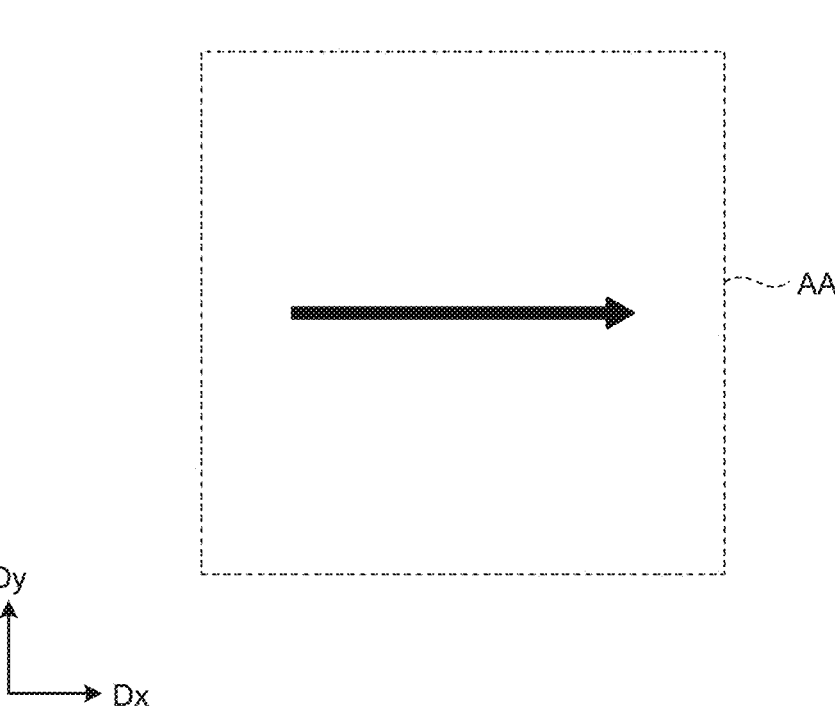
FIG. 6B is a diagram illustrating a rubbing direction of an alignment film of the second substrate.

FIG. 6A is a diagram illustrating the rubbing direction of the alignment film of the first substrate. FIG. 6B is a diagram illustrating the rubbing direction of the alignment film of the second substrate.

As illustrated in FIGS. 6A and 6B, the rubbing direction of the alignment film 18 of the first substrate and the rubbing direction of the alignment film 19 of the second substrate are directions intersecting each other in a plan view. Specifically, the rubbing direction of the alignment film 18 of the first substrate 5 illustrated in FIG. 6A is orthogonal to the extension direction of the drive electrodes 10a and 10b. The rubbing direction of the alignment film 19 of the second substrate 6 illustrated in FIG. 6B is orthogonal to the extension direction of the drive electrodes 13a and 13b.

Note that, the present embodiment describes the configuration in which one first liquid crystal cell 2 and one second liquid crystal cell 3 are stacked, but is not limited to this configuration, and for example, a configuration including a plurality of combinations of the first liquid crystal cell 2 and the second liquid crystal cell 3 stacked on each other is also applicable. For example, a configuration including two combinations of the first liquid crystal cell 2 and the second liquid crystal cell 3 stacked on each other, in other words, a configuration including two liquid crystal cells for p wave polarization and two liquid crystal cells for s wave polarization is applicable.

In the present disclosure, the distribution angle of light emitted from the light source 4 is controlled through drive voltage control of the first liquid crystal cell 2 and the second liquid crystal cell 3 in the illumination device 1 having the above-described configuration. The following describes the distribution angle of light from the illumination device 1, which is a control target in the present disclosure, with reference to FIG. 7.

Figure 7:
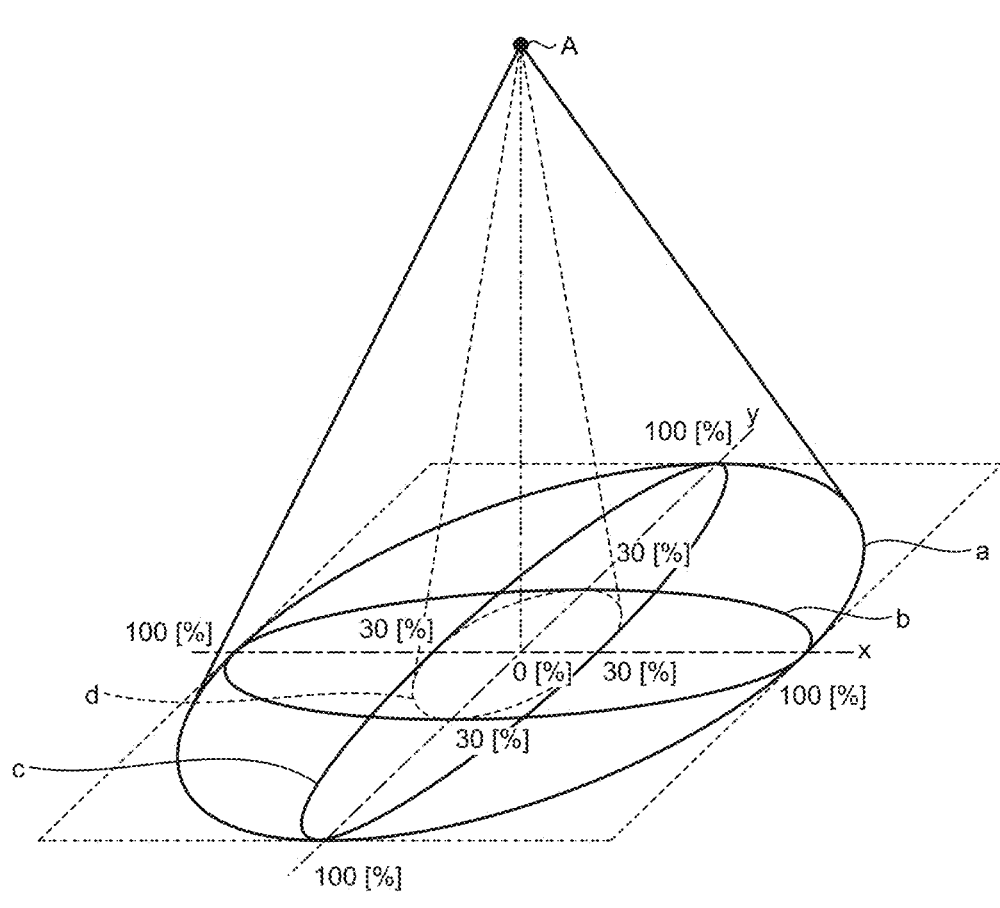
FIG. 7 is a conceptual diagram for conceptually describing the distribution angle of light from the illumination device according to the embodiment.
Figure 7:
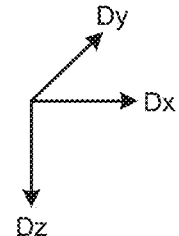

FIG. 7 is a conceptual diagram for conceptually describing the distribution angle of light from the illumination device according to the embodiment. In FIG. 7, the illumination device 1 is regarded as a point light source A, and the irradiation area of light on a virtual plane xy orthogonal to the Dz direction is illustrated. Note that, although FIG. 7 illustrates the example in which the illumination device 1 is regarded as the point light source A, light transmitting through the light modulation region AA of each of the first liquid crystal cell 2 and the second liquid crystal cell 3 is controlled as described above in reality, and thus the illuminance of light decreases around the irradiation area. Furthermore, the outline of the irradiation area is indistinct due to light diffraction phenomenon and the like.

As described above, in each of the first liquid crystal cell 2 and the second liquid crystal cell 3, the orientation direction of the liquid crystal molecules 17 in the liquid crystal layer 8 is controlled by supplying drive voltage to each of the drive electrodes 10 on the first substrate 5 and the drive electrodes 13 on the second substrate 6. Accordingly, the distribution angle of light emitted from the illumination device 1 can be controlled.

Specifically, for example, the orientation direction of the liquid crystal molecules 17 in the liquid crystal layer 8 of the first liquid crystal cell 2 changes and the distribution angle in the Dx direction changes in accordance with drive voltage applied to the drive electrodes 10 and 13 of the first liquid crystal cell 2. In the present disclosure, the minimum distribution angle in the Dx direction is 0 [%] and the maximum distribution angle in the Dx direction is 100 [%].

For example, the orientation direction of the liquid crystal molecules 17 in the liquid crystal layer 8 of the second liquid crystal cell 3 changes and the distribution angle in the Dy direction changes in accordance with drive voltage applied to the drive electrodes 10 and 13 of the second liquid crystal cell 3. In the present disclosure, the minimum distribution angle in the Dy direction is 0 [%] and the maximum distribution angle in the Dy direction is 100 [%].

In FIG. 7, "a" exemplarily illustrates the irradiation area in a case where the distribution angle in the Dx direction and the distribution angle in the Dy direction are both 100 [%]. In FIG. 7, "b" exemplarily illustrates the irradiation area in a case where the distribution angle in the Dx direction is 100 [%] and the distribution angle in the Dy direction is 30 [%]. In FIG. 7, "c" exemplarily illustrates the irradiation area in a case where the distribution angle in the Dx direction is 30 [%] and the distribution angle in the Dy direction is 100 [%]. In FIG. 7, "d" exemplarily illustrates the irradiation area in a case where the distribution angle in the Dx direction and the distribution angle in the Dy direction are both 30 [%].

In this manner, the distribution angle of light in the Dx and Dy directions can be controlled by performing drive voltage control of each of the first liquid crystal cell 2 and the second liquid crystal cell 3 in the illumination device 1 having the above-described configuration. Accordingly, the irradiation area of light from the illumination device 1 can be changed.

Figure 8:
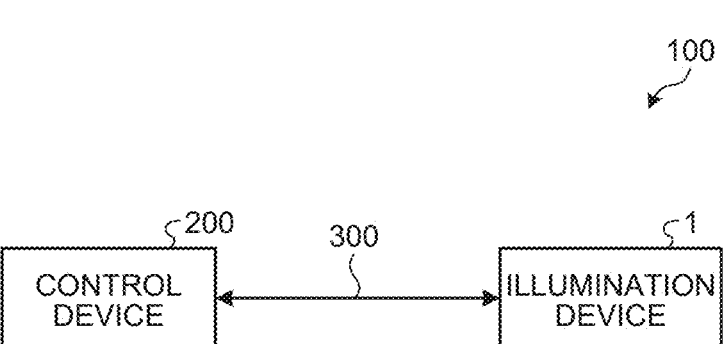
FIG. 8 is a schematic view illustrating an example of the configuration of an illumination control system according to a first embodiment.

FIG. 8 is a schematic view illustrating an example of the configuration of an illumination control system according to a first embodiment. The illumination control system includes the illumination device 1 and a control device 200. The control device 200 is, for example, a portable communication terminal device such as a smartphone or a tablet.

Data and various command signals are transmitted and received between the illumination device 1 and the control device 200 through a communication means 300. In the present disclosure, the communication means 300 is a wireless communication means such as Bluetooth (registered trademark) or WiFi (registered trademark). Wireless communication may be performed between the illumination device 1 and the control device 200 through a predetermined network such as a mobile communication network. Alternatively, the illumination device 1 and the control device 200 may be coupled to each other in a wired manner to perform wired communication therebetween.

Figure 9:
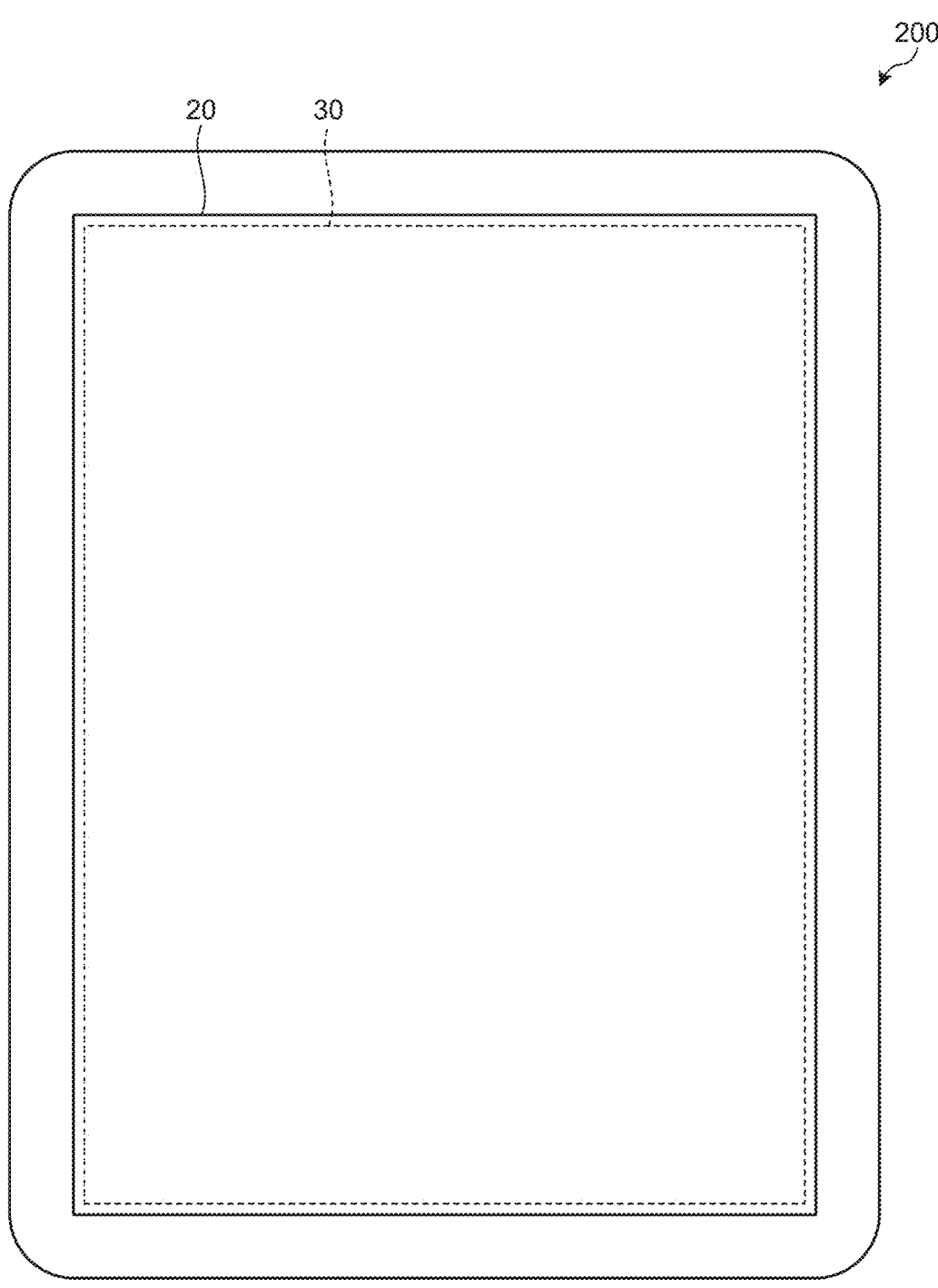
FIG. 9 is an exterior diagram illustrating an example of a control device according to the embodiment.

FIG. 9 is an exterior diagram illustrating an example of the control device according to the embodiment. The control device 200 is a display device equipped with a touch detection function, in which a display panel 20 and a touch sensor 30 are integrated. Specifically, the display panel 20 is what is called an in-cell type or hybrid type device in which the touch sensor 30 is built and integrated. The configuration in which the touch sensor 30 is built and integrated in the display panel 20 includes, for example, a configuration in which some members such as substrates and electrodes used as the display panel 20 and some members such as substrates and electrodes used as the touch sensor 30 are shared. Note that the display panel 20 may be what is called an on-cell type device in which the touch sensor 30 is mounted on a display device.

The display panel 20 is, for example, a liquid crystal display panel including a liquid crystal display element. The display panel 20 is not limited thereto but may be, for example, an organic EL display panel (OLED: organic light emitting diode) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 10:
FIG. 10 is a conceptual diagram illustrating an example of a touch detection region of a touch sensor.
Figure 10:
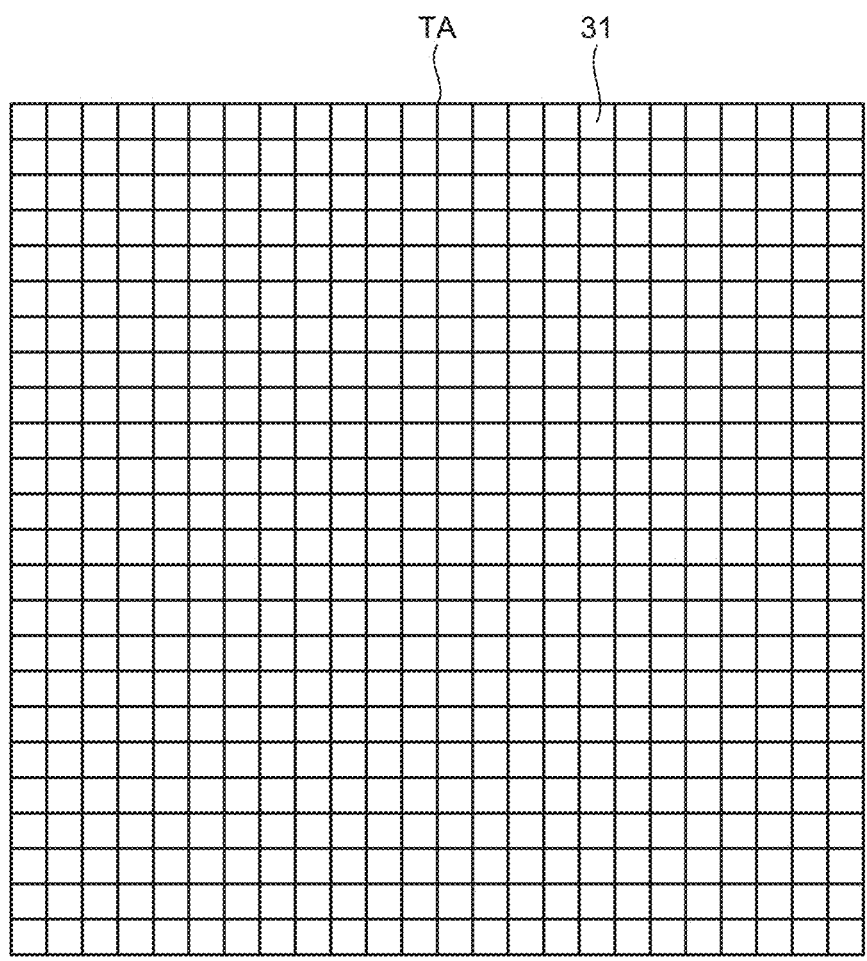
Figure 10:
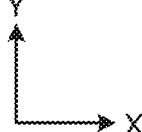

FIG. 10 is a conceptual diagram illustrating an example of a touch detection region of the touch sensor. A plurality of detection elements 31 are provided in a detection region FA of the touch sensor 30. In the detection region FA of the touch sensor 30, the detection elements 31 are arranged in an X direction (first direction) and a Y direction (second direction) orthogonal to the X direction and provided in a matrix of rows and columns. In other words, the touch sensor 30 includes the detection region FA overlapping the detection elements 31 arranged in the X direction (first direction) and the Y direction (second direction).

Figure 11:
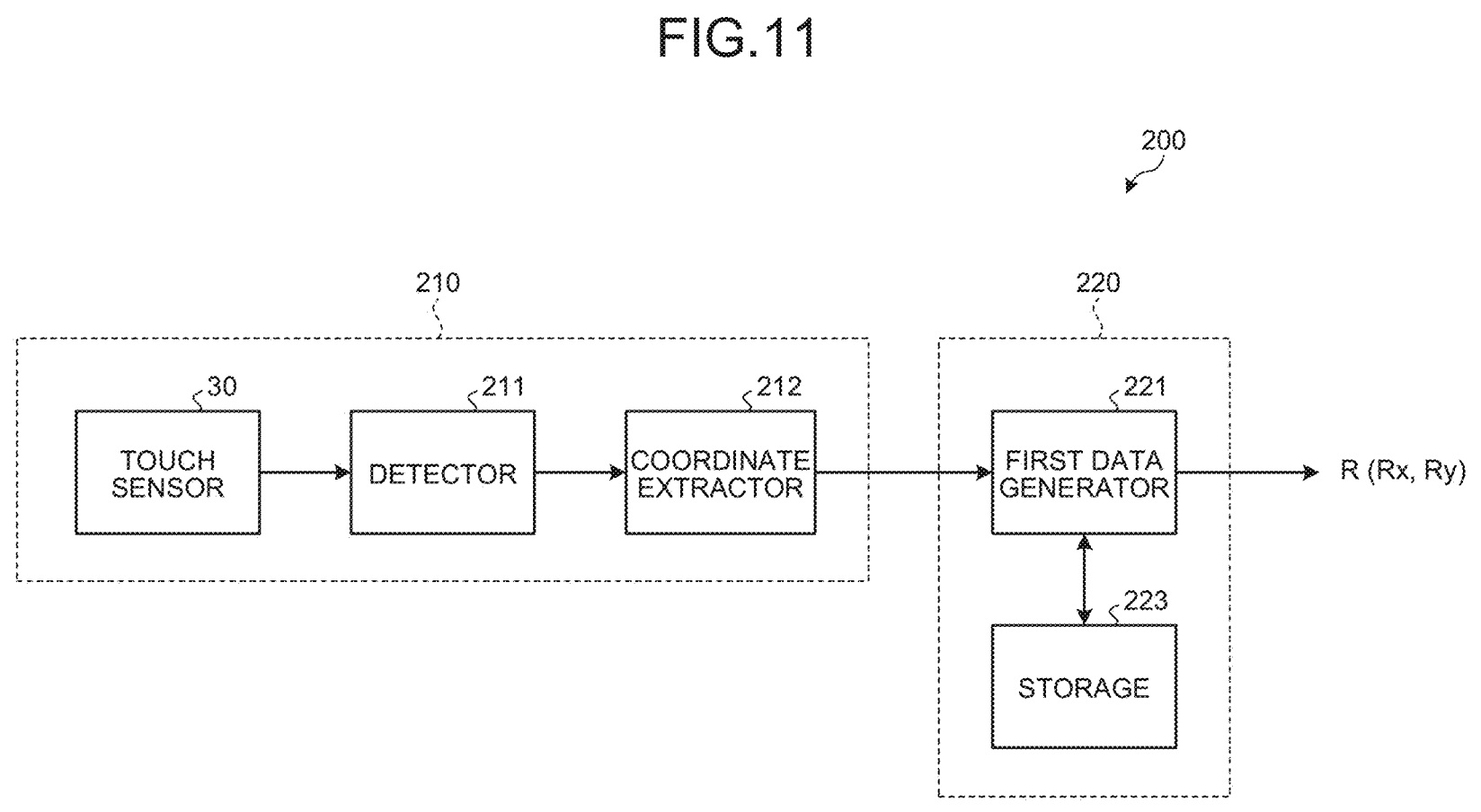

FIG. 11 is a diagram illustrating an example of a control block configuration that adjusts first data transmitted to the illumination device in the control device according to the embodiment.

As illustrated in FIG. 11, the control device 200 according to the embodiment includes a detection device 210 and a processing device 220. The detection device 210 includes the touch sensor 30, a detector 211, and a coordinate extractor 212. The processing device 220 includes a first data generator 221 and a storage 223. The detector 211 and the coordinate extractor 212 of the detection device 210 are each constituted by, for example, a detection IC. The processing device 220 includes, for example, a central processing unit (CPU), a random access memory (RAM), an electrically erasable programmable read only memory (EE-PROM), and a read only memory (ROM) of the smartphone, the tablet, or the like as the control device 200.

The detector 211 is a circuit configured to detect existence of a touch on the touch sensor 30 based on a detection signal output from each detection element 31 of the touch sensor 30.

The coordinate extractor 212 is a logic circuit configured to calculate the coordinate of a touch detection position when a touch is detected by the detector 211.

The first data generator 221 generates the first data in the X and Y directions based on the touch detection position extracted by the coordinate extractor 212. The first data generator 221 is a component implemented by, for example, the CPU of the smartphone, the tablet, or the like as the control device 200.

The storage 223 is constituted by, for example, the RAM, EEPROM, or ROM of the smartphone, the tablet, or the like as the control device 200. In the present disclosure, the storage 223 stores, for example, the first data corresponding to the coordinate of the touch detection position extracted by the coordinate extractor 212.

Figure 12:
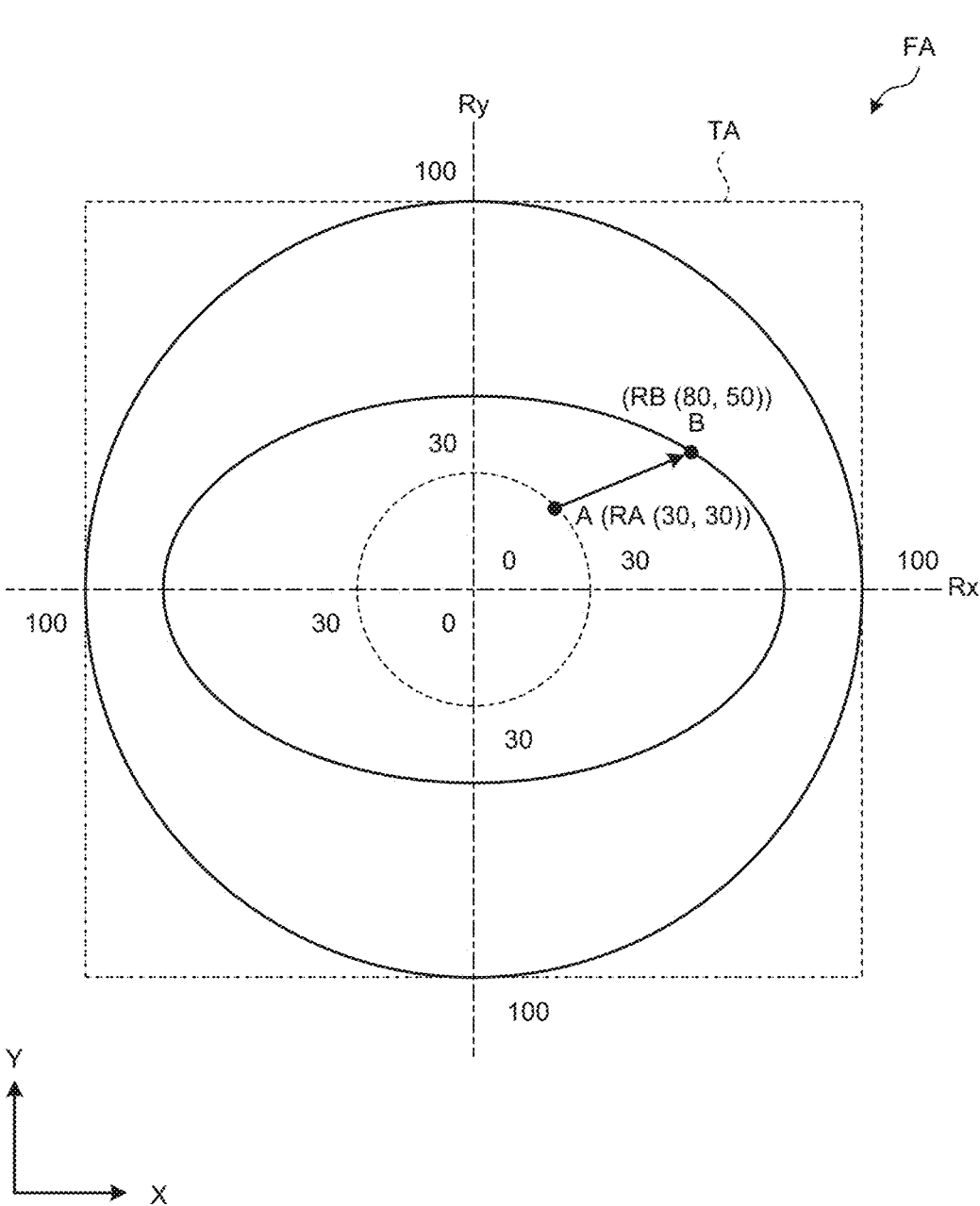
FIG. 12 is a conceptual diagram illustrating an example of a method of adjusting the first data in the embodiment.

A method of adjusting the first data at the illumination device 1 in the above-described configuration according to a first embodiment will be described below. FIG. 12 is a conceptual diagram illustrating an example of the method of adjusting the first data in the embodiment.

As illustrated in FIG. 12, a data adjustment region TA is provided in the detection region FA of the touch sensor 30. The horizontal axis of the data adjustment region TA represents a coordinate axis in the X direction (first direction) and corresponds to the Dx direction of the illumination device 1. The vertical axis of the data adjustment region TA represents a coordinate axis in the Y direction (second direction) and corresponds to the Dy direction of the illumination device 1. The data adjustment region TA only needs to be provided in the detection region FA of the touch sensor 30 and may be the entire detection region FA.

In the present embodiment, the first data in the X direction and the first data in the Y directions are discrete values obtained by normalizing information of the light distribution angle controlled at the illumination device 1. Specifically, in the present embodiment, the first data generator 221 generates first data R(Rx, Ry) by using information of the light distribution angle to be controlled at the illumination device 1 as a parameter of control at the control device 200. Hereinafter, the first data R(Rx, Ry) generated by the first data generator 221 in the present embodiment is also referred to as "first light distribution angle information".

The first data Rx of the X direction and the first data Ry of the Y direction are defined to be values corresponding to the coordinate of the touch detection position detected in the data adjustment region TA. In the example illustrated in FIG. 12, the first data Rx of the X direction and the first data Ry of the Y direction each can take a value of "0" to "100". The circle illustrated with a dashed line in FIG. 12A indicates the locus of the coordinate of a position where the first data Rx of the X direction is "30" and the first data Ry of the Y direction is "30", the circle illustrated with a solid line indicates the locus of the coordinate of a position where the first data Rx of the X direction is "100" and the first data Ry of the Y direction is "100", and the ellipse illustrated with a solid line indicates the locus of the coordinate of a position where the first data Rx of the X direction is "80" and the first data Ry of the Y direction is "50".

In the example illustrated in FIG. 12, the coordinate of the touch detection position is moved from a position A to a position B in the data adjustment region TA by the coordinate extractor 212. In this case, the first data generator 221 generates the first data R(Rx, Ry) in accordance with the coordinate (x, y) of the touch detection position, which is output from the coordinate extractor 212 in a temporally sequential manner while the coordinate of the touch detection position moves from the position A to the position B in the data adjustment region TA. Specifically, the relation between change ΔR(ΔRx, ΔRy) of the first data R(Rx, Ry) by one step and change (Δx, Δy) of the coordinate (x, y) of the touch detection position by one step is expressed by Expressions (1) and (2) below. In the expressions, k is a coefficient determined by the number of detection elements 31 in the data adjustment region TA.

$$\Delta Rx = k \times \Delta x \quad (1)$$

$$\Delta Ry = k \times \Delta y \quad (2)$$

Specifically, in a case of k=4, for example, the first data changes by one step when the coordinate of the touch detection position moves by four. In other words, the change amount of the first data R(Rx, Ry) is proportional to the movement amount of the coordinate (x, y) of the touch detection position.

The control device 200 sequentially transmits the first data R(Rx, Ry) generated by the first data generator 221 to the illumination device 1.

Figure 13A:
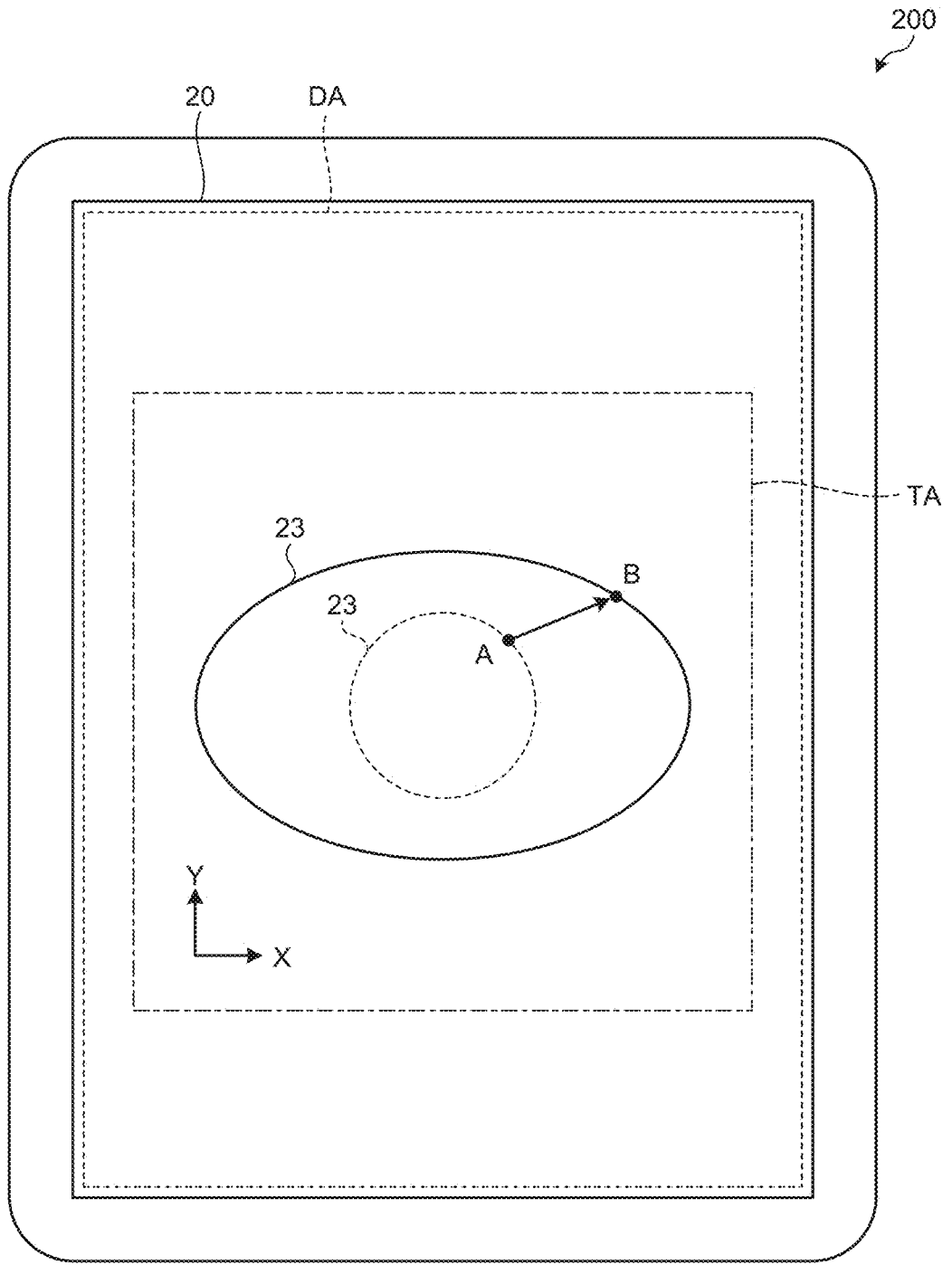
FIG. 13A is a conceptual diagram illustrating a first display aspect of the control device according to the first embodiment for adjusting the first data.
Figure 13B:
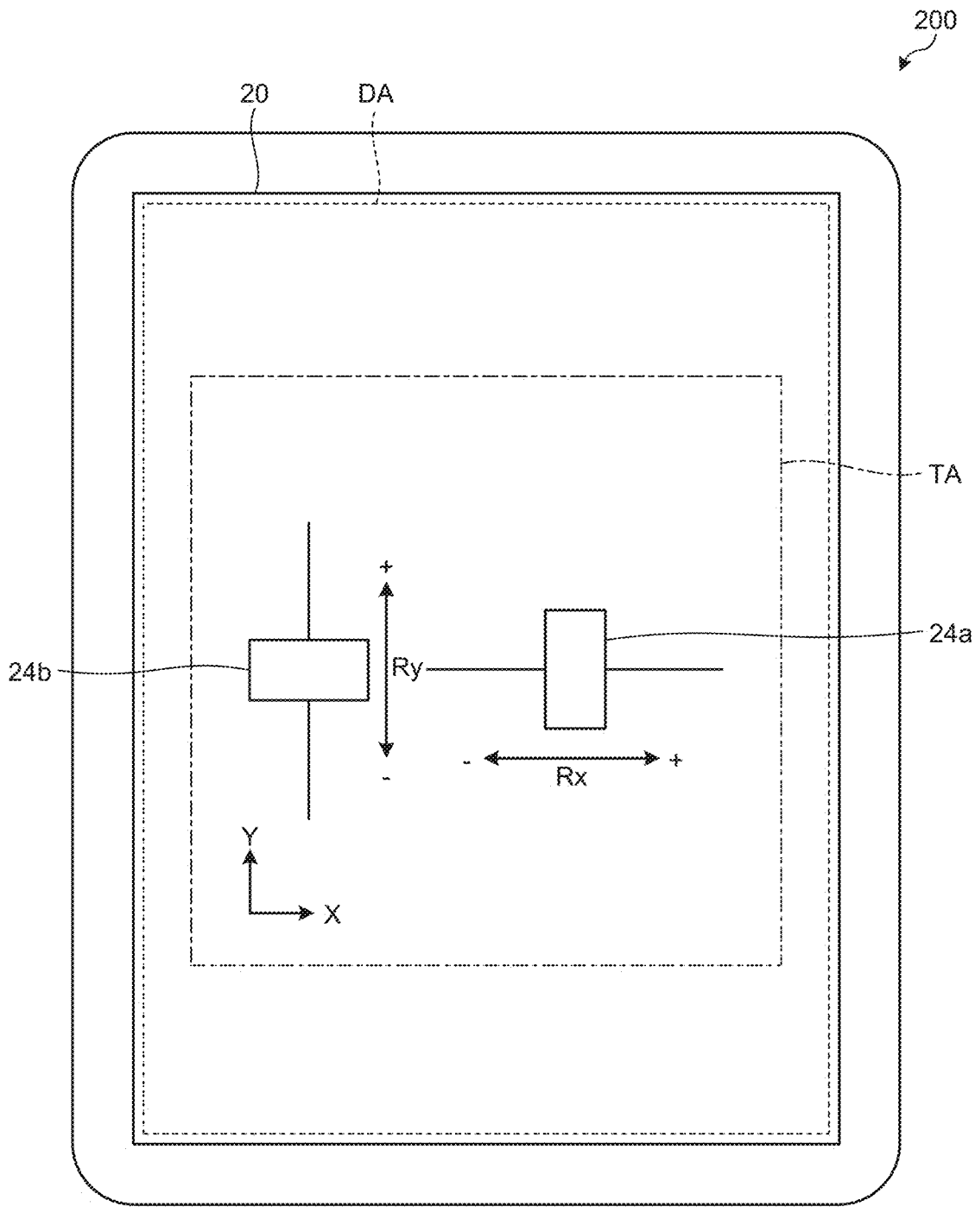
FIG. 13B is a conceptual diagram illustrating a second display aspect of the control device according to the first embodiment for adjusting the first data.

FIG. 13A is a conceptual diagram illustrating a first display aspect of the control device according to the embodiment for adjusting the first data. FIG. 13B is a conceptual diagram illustrating a second display aspect of the control device according to the embodiment for adjusting the first data.

A display region DA that overlaps the detection region FA of the touch sensor 30 illustrated in FIG. 9 in plan view is provided on the display panel 20.

In the aspect illustrated in FIG. 13A, the locus of the coordinate of the position corresponding to the first data R(Rx, Ry) on the data adjustment region TA is displayed as a schematic shape image 23 of the irradiation area. In this first display aspect, the first data Rx of the X direction and the first data Ry of the Y direction are simultaneously adjusted by, for example, tapping and swiping the position A on the schematic shape image 23 of the irradiation area to the position B.

In the aspect illustrated in FIG. 13B, a slide bar 24a for adjusting the first data Rx of the X direction and a slide bar 24b for adjusting the first data Ry of the Y direction are displayed on the data adjustment region TA. In this second display aspect, the first data Rx is adjusted by tapping and swiping the slide bar 24a in the X direction, and the first data Ry is adjusted by tapping and swiping the slide bar 24b in the Y direction.

Note that the aspect of adjusting the first data is not limited to the above-described aspects but may be, for example, an aspect in which the control device 200 is provided with physical sliders.

Figure 14:
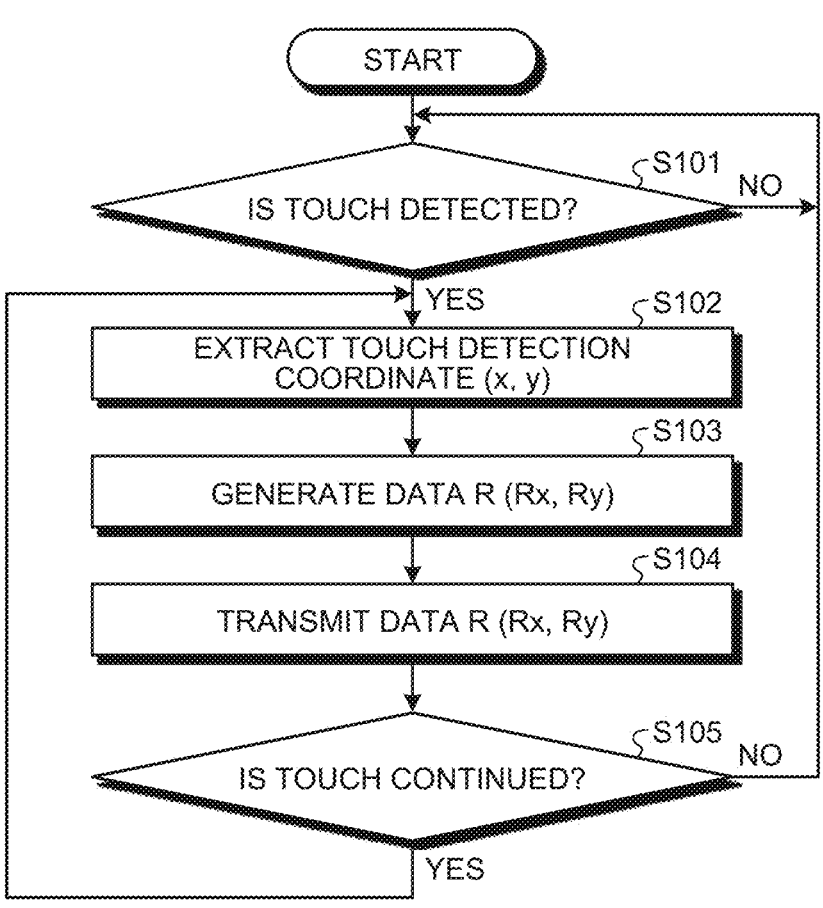
FIG. 14 is a flowchart illustrating an example of first data generation processing at the control device according to the first embodiment.

FIG. 14 is a flowchart illustrating an example of first data generation processing at the control device according to the embodiment.

The detector 211 detects existence of a touch in the data adjustment region TA of the touch sensor 30 (step S101).

In a case where a touch is detected in the data adjustment region TA (Yes at step S101), the coordinate extractor 212 extracts the coordinate (x, y) of the touch detection position (step S102).

The first data generator 221 generates the first data R(Rx, Ry) corresponding to the coordinate (x, y) of the touch detection position (step S103). Specifically, the first data generator 221 reads, from the storage 223, the first data R(Rx, Ry) corresponding to the coordinate (x, y) of the touch detection position extracted by the coordinate extractor 212.

The control device 200 transmits the first data R(Rx, Ry) generated by the first data generator 221 to the illumination device 1 through the communication means 300 (step S104).

The detector 211 detects whether the touch is continued in the data adjustment region TA of the touch sensor 30 (step S105).

In a case where no touch is detected at step S101 (No at step S101) or in a case where the touch is not continued at step S105 (No at step S105), the process returns to the processing at step S101 to repeatedly execute the same processing.

In a case where the touch is continued in the data adjustment region TA of the touch sensor 30 (Yes at step S105), the process returns to the processing at step S102 to repeatedly execute the processing at step S102 and later.

The illumination device 1 changes the light distribution angle and the light emission intensity in the Dx and Dy directions in accordance with the first data R(Rx, Ry)

transmitted from the control device 200. The configuration and operation of the illumination device according to the first embodiment for controlling the light distribution angle and the light emission intensity will be described below.

First Embodiment

Figure 15:
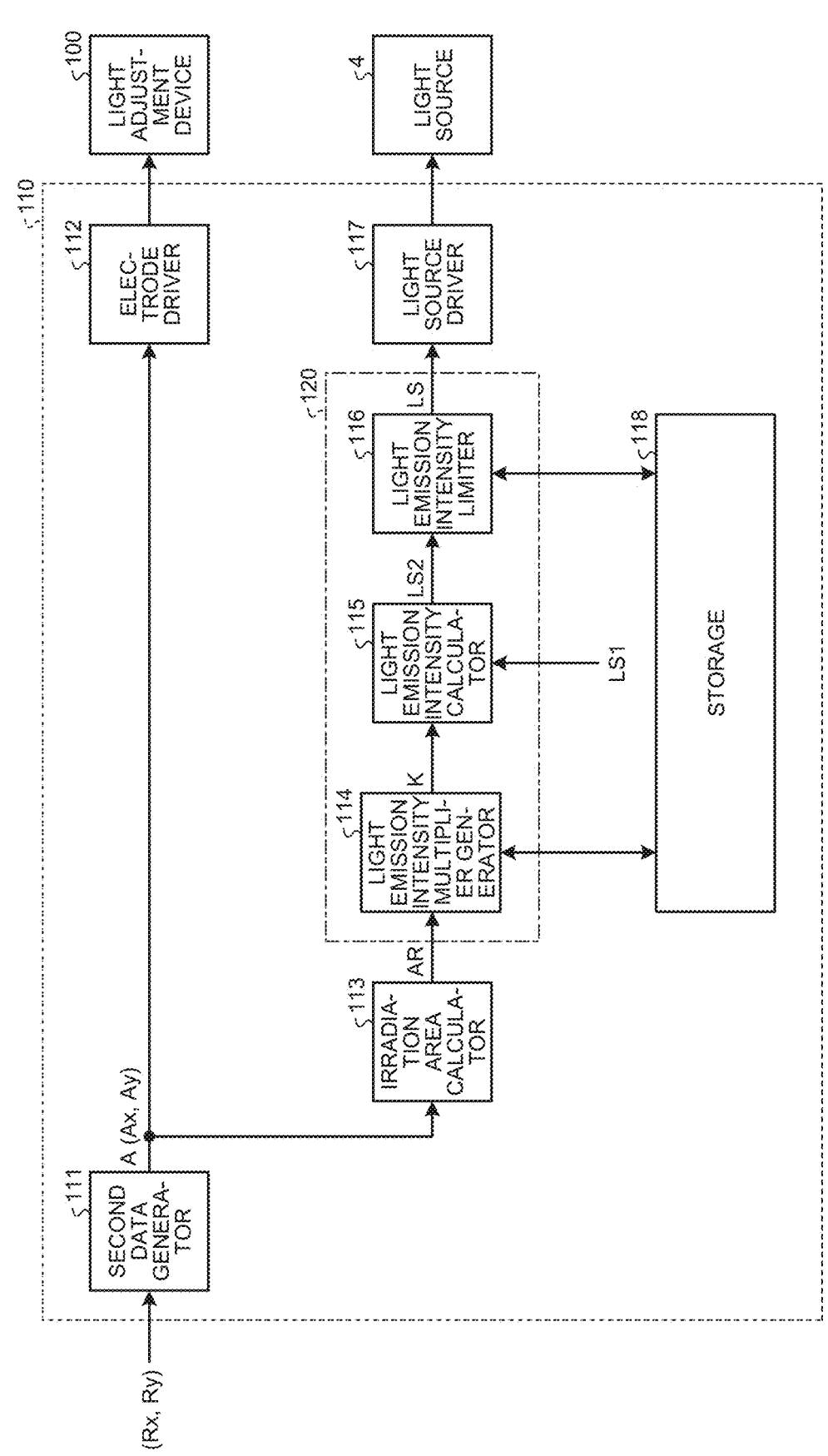
FIG. 15 is a diagram illustrating an example of a control block configuration of the illumination device according to the first embodiment.

FIG. 15 is a diagram illustrating an example of a control block configuration of the illumination device according to the first embodiment.

As illustrated in FIG. 15, a controller 110 of the illumination device 1 according to the first embodiment includes a second data generator 111, an electrode driver 112, an irradiation area calculator 113, a light source driver 117, a storage 118, and a light emission intensity generator 120. The light emission intensity generator 120 includes a light emission intensity multiplier generator 114, a light emission intensity calculator 115, and a light emission intensity limiter 116.

The second data generator 111 generates second data including information (light distribution angle A(Ax, Ay)) of light distribution angles Ax and Ay of the illumination device 1 in the Dx and Dy directions, respectively, based on the first light distribution angle information (first data R(Rx, Ry)) received from the control device 200.

In the present embodiment, the light distribution angle Ax in the Dx direction and the light distribution angle Ay in the Dy direction, which are included in the second data generated by the second data generator 111 can each range from 10 [deg] to 90 [deg]. The second data generator 111 generates the second data including information of the light distribution angle Ax and the light distribution angle Ay in the Dy direction, corresponding to the first light distribution angle information (first data R(Rx, Ry)). The second data are discrete values obtained by normalizing information (the light distribution angle Ax in the Dx direction and the light distribution angle Ay in the Dy direction) of the light distribution angle controlled at the illumination device 1 (light adjustment device 100). Hereinafter, the second data (light distribution angle A(Ax, Ay)) generated by the second data generator 111 in the present embodiment is also referred to as "second light distribution angle information". The second light distribution angle information (second data (light distribution angle A(Ax, Ay))) is a command value of the light distribution angle controlled at the illumination device 1 (light adjustment device 100).

The electrode driver 112 supplies drive voltage to the drive electrodes 10 and 13 of the first liquid crystal cell 2 and the second liquid crystal cell 3 of the light adjustment device 100 based on the second light distribution angle information (second data (light distribution angle A(Ax, Ay))) generated by the second data generator 111.

Note that a component corresponding to the second data generator 111 may be provided at the control device 200. In this case, the second light distribution angle information (second data (light distribution angle A(Ax, Ay))) may be transmitted from the control device 200.

The irradiation area calculator 113 calculates an irradiation area AR based on the second light distribution angle information (second data (light distribution angle A(Ax, Ay))). The irradiation area of light emitted from the illumination device 1 is determined by the distance between the illumination device 1 and an irradiation target object. The "irradiation area" in the present disclosure is a relative value calculated by using the light distribution angle A(Ax, Ay). A method of calculating the irradiation area AR will be described later.

The light emission intensity multiplier generator 114 generates a light emission intensity multiplier K relative to a reference light emission intensity at a reference light distribution angle based on the irradiation area AR calculated by the irradiation area calculator 113.

The reference light distribution angle in the present disclosure is the minimum value (for example, 10 [deg]) of the range (for example, 10 [deg] to 90 [deg]) of the light distribution angle A(Ax, Ay), in other words, the minimum value of the range of light distribution angle control at the illumination device 1 (light adjustment device 200). Note that the reference light distribution angle is not limited to the above-described value but may be an optional light distribution angle in the range of light distribution angle control at the illumination device 1 (light adjustment device 200).

In a case where the reference light distribution angle is the minimum value (for example, 10 [deg]) of the range of the light distribution angle A(Ax, Ay), the reference light emission intensity of the illumination device 1 (light source 4) is, for example, 5 [lm (lumen)]. The light emission intensity in the present disclosure is a value normalized with respect to the reference light emission intensity (for example, 5 [lm]) set at the reference light distribution angle in advance. Note that, in a case where the reference light distribution angle is an optional light distribution angle in the range of light distribution angle control at the illumination device 1 (light adjustment device 200), the reference light emission intensity of the illumination device 1 (light source 4) can be changed to a value in accordance with the reference light distribution angle.

The light emission intensity calculator 115 calculates a second light emission intensity LS2 by multiplying a first light emission intensity LS1 by the light emission intensity multiplier K generated by the light emission intensity multiplier generator 114. The first light emission intensity LS1 is, for example, the reference light emission intensity. The first light emission intensity LS1 is not limited to the reference light emission intensity but may be, for example, a light emission intensity command value transmitted from the control device 200.

The light emission intensity limiter 116 outputs a light emission intensity LS obtained by limiting the upper limit of the second light emission intensity LS2 calculated by the light emission intensity calculator 115 to a light emission intensity limitation value.

The light source driver 117 supplies drive current to the light source 4 based on the light emission intensity LS output from the light emission intensity limiter 116.

In the present embodiment, a look-up table (refer to FIG. 21) indicating the correspondence relation between the irradiation area AR and the light emission intensity multiplier K is stored in the storage 118. The light emission intensity multiplier generator 114 refers to the look-up table stored in the storage 118 to read the light emission intensity multiplier K corresponding to the irradiation area AR calculated by the irradiation area calculator 113, and outputs the light emission intensity multiplier K to the light emission intensity calculator 115.

In the present embodiment, a light emission intensity limitation value LS_lim is stored in the storage 118. The light emission intensity limiter 116 limits the upper limit of the second light emission intensity LS2 calculated by the light emission intensity calculator 115 to the light emission intensity limitation value LS_lim stored in the storage 118.

Figure 16A:
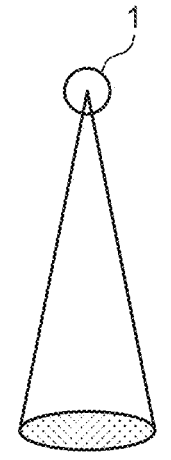
FIG. 16A is a first schematic diagram illustrating the relation between the irradiation region and illuminance of light.
Figure 16B:
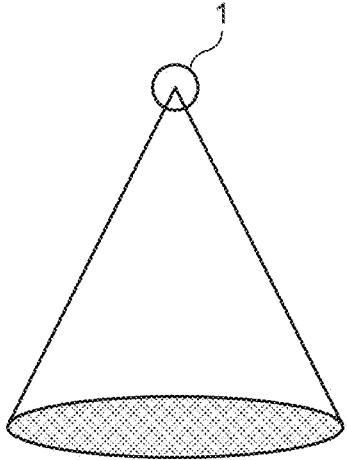
FIG. 16B is a second schematic diagram illustrating the relation between the irradiation region and illuminance of light.

FIG. 16A is a first schematic diagram illustrating the relation between the irradiation region and illuminance of light. FIG. 16B is a second schematic diagram illustrating the relation between the irradiation region and illuminance of light. In examples illustrated in FIGS. 16A and 16B, the light emission intensity of the light source of the illumination device 1 is constant irrespective of the irradiation area.

When the irradiation region of light is changed while the light emission intensity of the illumination device 1 is kept constant, the light quantity per unit area in the irradiation region is different between cases where the irradiation region is relatively large and small. More specifically, as illustrated in FIG. 16B, the light quantity per unit area in the irradiation region is smaller in a case where the irradiation area is larger than in the example illustrated in FIG. 16A. In other words, as illustrated in FIG. 16B, illuminance in the irradiation region is lower in a case where the irradiation area is larger than in the example illustrated in FIG. 16A. Thus, the light emission intensity of the light source needs to be adjusted in accordance with the irradiation area of light to keep relative brightness constant when the light distribution angle is changed.

Figure 17:
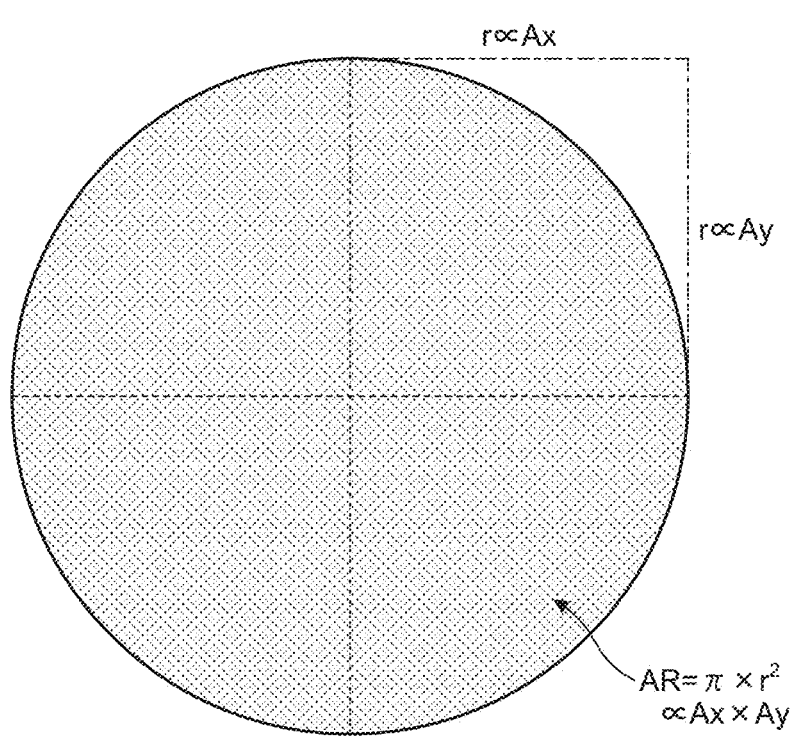
FIG. 17 is a first schematic diagram illustrating the relation between the irradiation area of light and the light distribution angle.
Figure 17:
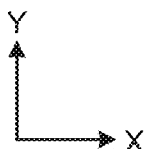

FIG. 17 is a first schematic diagram illustrating the relation between the irradiation area of light and the light distribution angle. FIG. 17 exemplarily illustrates a case where the light distribution angle Ax in the X direction and the light distribution angle Ay in the Y direction are equal to each other (Ax=Ay), in other words, a case where the irradiation region has a circular outline.

In FIG. 17, the irradiation area AR is expressed by Expression (3) below, where r represents the radius of the irradiation region.

$$AR = \Pi \times r^2 \qquad (3)$$

The light distribution angle Ax in the X direction and the light distribution angle Ay in the Y direction is proportional to the radius r of the irradiation region. Thus, the irradiation area AR can be expressed by Expression (4) below.

$$AR \propto Ax \times Ay \qquad (4)$$

Figure 18:
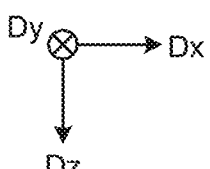
FIG. 18 is a schematic diagram illustrating the relation between the light distribution angle and the area ratio to the irradiation area at a reference light distribution angle.
Figures 19, 20:
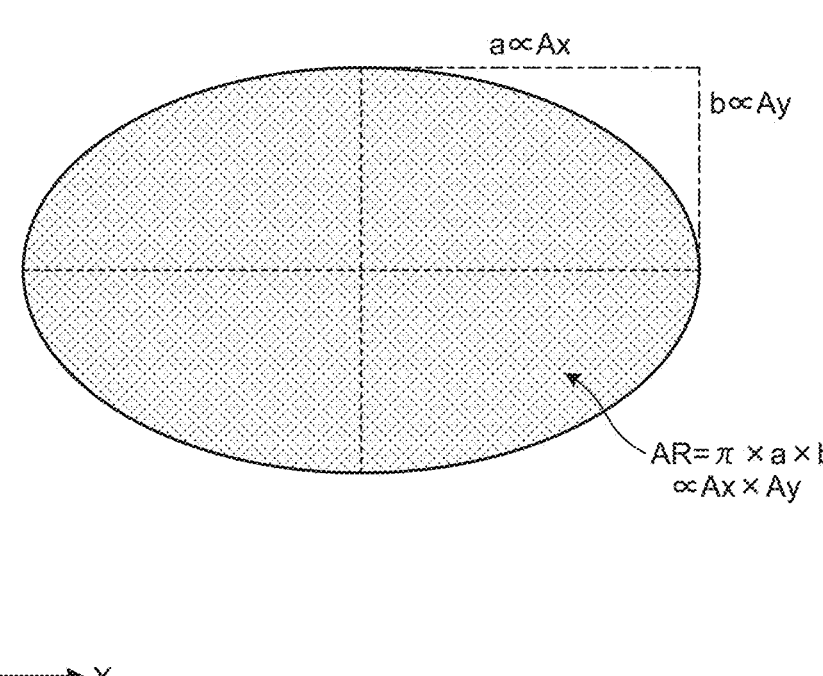
FIG. 19 is a line diagram illustrating the relation between the light distribution angle and the area ratio to the irradiation area at the reference light distribution angle.
FIG. 20 is a second schematic diagram illustrating the relation between the irradiation area of light and the light distribution angle.

FIG. 18 is a schematic diagram illustrating the relation between the light distribution angle and the area ratio to the irradiation area at the reference light distribution angle. FIG. 19 is a line diagram illustrating the relation between the light distribution angle and the area ratio to the irradiation area at the reference light distribution angle. FIG. 18, illustrates a sectional view along a perpendicular line h extending from the illumination device 1 to an XY plane where the illumination device 1 is regarded as a point light source. The solid line illustrated in FIG. 19 represents the irradiation area ratio at an optional light distribution angle with respect to the irradiation area (AR_nor) at the reference light distribution angle (in this example, 10 [deg]) on the XY plane.

A dashed line illustrated with a dashed line in FIG. 18 represents a spherical surface centered at the illumination device 1. The light distribution angle and the irradiation area at the light distribution angle are proportional on the spherical surface. Thus, when the light distribution angle Ax in the X direction and the light distribution angle Ay in the Y direction is A (Ax=Ay=A), the irradiation area ratio at an optional light distribution angle with respect to the irradiation area at the reference light distribution angle (in this example, 10 [deg]) on the spherical surface illustrated with the dashed line in FIG. 18 can be expressed by a quadric curve of the square (A²) of the light distribution angle A as illustrated with a dashed line in FIG. 19.

As illustrated in FIG. 18, the irradiation area AR on the XY plane increases in accordance with separation from an intersection point of the perpendicular line h and the XY plane. Thus, as illustrated in FIG. 19, the irradiation area ratio (AR/AR_nor) at an optional light distribution angle with respect to the irradiation area (AR_nor) on the XY plane at the reference light distribution angle (in this example, 10 [deg]) is larger as compared to the quadric curve illustrated with the dashed line as the light distribution angle is larger.

Specifically, for example, the irradiation area ratio at an optional light distribution angle on the spherical surface centered at the illumination device 1 with respect to the irradiation area at the reference light distribution angle (in this example, 10 [deg]) on the spherical surface centered at the illumination device 1 is 16 when the light distribution angle is 40 [deg], which is four time larger than the area ratio of 4 when the light distribution angle is 20 [deg].

The irradiation area ratio AR at an optional light distribution angle on the XY plane with respect to the irradiation area (AR_nor) at the reference light distribution angle (in this example, 10 [deg]) on the XY plane is 17.3 when the light distribution angle is 40 [deg], which is 4.26 times larger than the area ratio of 4.06 when the light distribution angle is 20 [deg].

In the present disclosure, the light emission intensity multiplier K is the irradiation area ratio (AR/AR_nor) with respect to the irradiation area (AR_nor) on the XY plane at the reference light distribution angle (in this example, 10 [deg]). In other words, the light emission intensity multiplier K is the irradiation area ratio (AR/AR_nor) to a reference irradiation area (AR_nor) that is the irradiation area (AR_nor) on the XY plane at the reference light distribution angle (in this example, 10 [deg]). Specifically, for example, the light emission intensity multiplier K is "2" when the irradiation area ratio AR/AR_nor is two. Accordingly, relative brightness can be kept substantially constant when the light distribution angle is changed.

FIG. 20 is a second schematic diagram illustrating the relation between the irradiation area of light and the light distribution angle. FIG. 20 exemplarily illustrates a case where the light distribution angle Ax in the X direction and the light distribution angle Ay in the Y direction are different from each other (in FIG. 20, Ax>Ay), in other words, a case where the irradiation region has an elliptical outline.

In FIG. 20, the irradiation area AR is expressed by Expression (5) below, where "a" represents the semi-major axis of the irradiation region and "b" represents the semi-minor axis thereof.

$$AR = \Pi \times a \times b \qquad (5)$$

The light distribution angle Ax in the X direction is proportional to the semi-major axis "a", and the light distribution angle Ay in the Y direction is proportional to the semi-minor axis "b". Thus, the irradiation area AR can be expressed by Expression (6) below.

$$AR \propto Ax \times Ay \qquad (6)$$

From Expressions (4) and (6) above, the irradiation area AR is proportional to the light distribution angle Ax in the X direction and the light distribution angle Ay in the Y direction whether or not the outline of the irradiation region is circular or elliptical. Thus, it is possible to derive the light emission intensity multiplier K irrespective of the ratio of the light distribution angle Ax in the X direction and the light distribution angle Ay in the Y direction (in other words, the irradiation region is circular or elliptical) by using the correspondence relation between the irradiation area AR, which is determined by the light distribution angle Ax in the X direction and the light distribution angle Ay in the Y direction, and the irradiation area ratio AR/AR_nor (=the light emission intensity multiplier K) to the reference irradiation area AR_nor in place of the correspondence relation between the light distribution angle and the irradiation area ratio, which is illustrated in FIG. 19.

Figure 21:
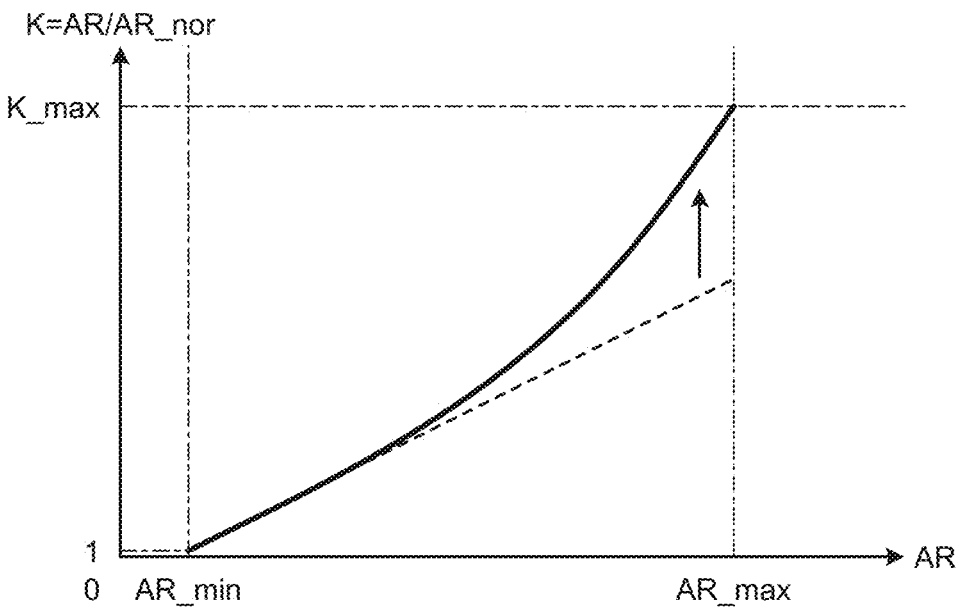
FIG. 21 is a line diagram illustrating the correspondence relation between the irradiation area of light and a light emission intensity multiplier.

The relation between the irradiation area AR and the light emission intensity multiplier K (=AR/AR_nor) may be as illustrated in FIG. 21. FIG. 21 is a line diagram illustrating the correspondence relation between the irradiation area of light and the light emission intensity multiplier.

In FIG. 21, a dashed line represents the irradiation area ratio (light emission intensity multiplier) at an optional light distribution angle on the spherical surface centered at the illumination device 1 with respect to the irradiation area on the XY plane at the reference light distribution angle (in this example, 10 [deg]) on the spherical surface centered at the illumination device 1. The correspondence relation between the irradiation area and the irradiation area ratio (light emission intensity multiplier) is linear on the spherical surface centered at the illumination device 1 (the dashed line illustrated in FIG. 18).

The irradiation area ratio AR/AR_nor (light emission intensity multiplier K) at an optional light distribution angle on the XY plane with respect to the irradiation area AR_nor at the reference light distribution angle (in this example, 10 [deg]) on the XY plane is larger as compared to the irradiation area ratio on the spherical surface centered at the illumination device 1, which is illustrated with the dashed line, as the light distribution angle is larger.

In the illumination device 1 according to the present embodiment, the look-up table as illustrated in FIG. 21 is held in the storage 118 as information indicating the correspondence relation between the irradiation area AR and the light emission intensity multiplier K, and the light emission intensity multiplier generator 114 generates the light emission intensity multiplier K by using the look-up table.

Then, the light emission intensity calculator 115 calculates the second light emission intensity LS2 by multiplying the first light emission intensity LS1 by the light emission intensity multiplier K. Accordingly, relative brightness can be kept substantially constant when the light distribution angle is changed.

Note that information indicating the correspondence relation between the irradiation area AR and the light emission intensity multiplier K is not limited to a look-up table as illustrated in FIG. 21 but may be, for example, a function that defines the correspondence relation between the irradiation area AR and the light emission intensity multiplier K and is stored in the storage 118, or may be the light emission intensity multiplier K corresponding to the irradiation area AR and stored as data.

Figure 22:
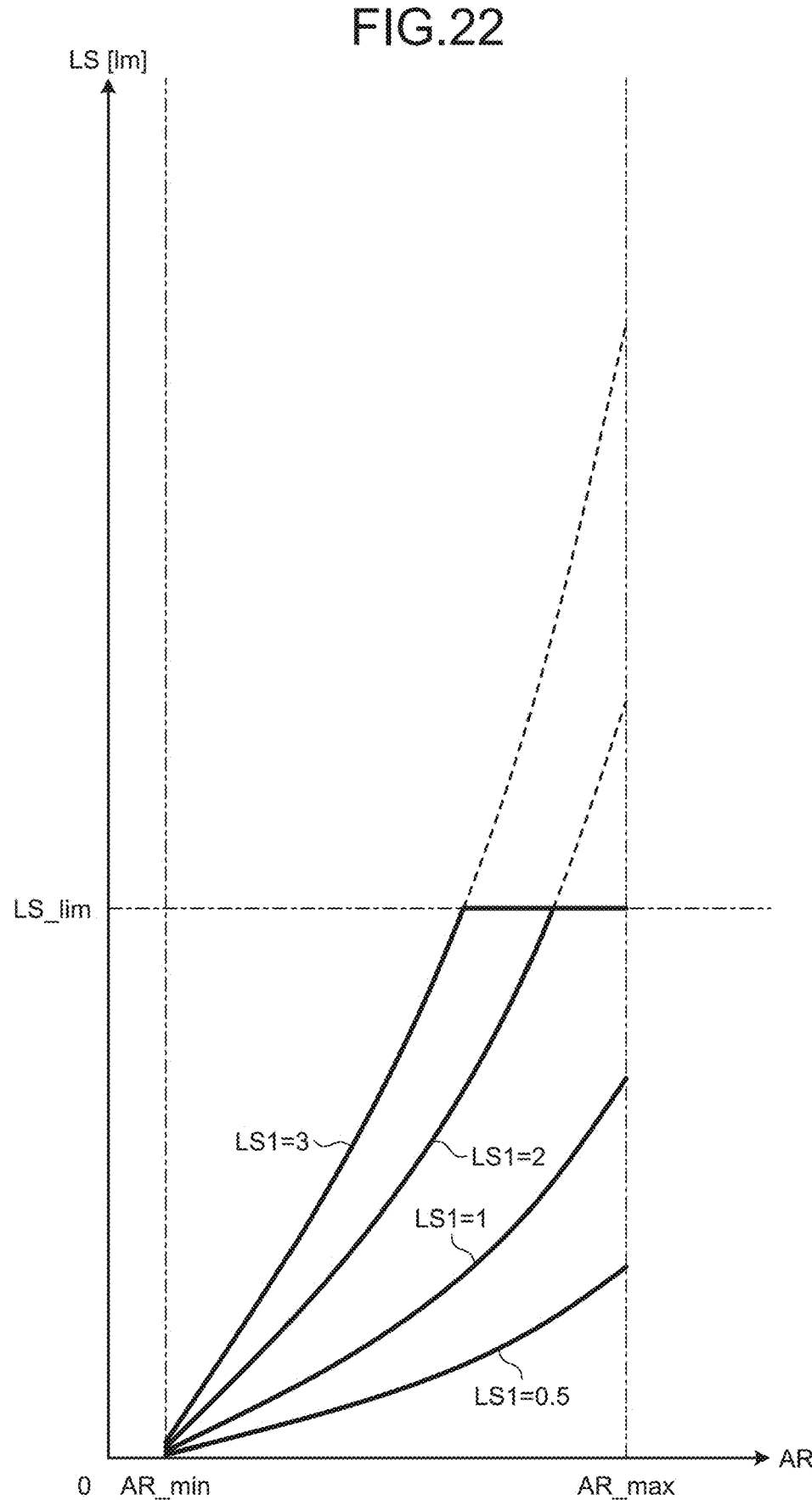
FIG. 22 is a line diagram illustrating a specific example of the light emission intensity of the illumination device according to the first embodiment.

FIG. 22 is a line diagram illustrating a specific example of the light emission intensity of the illumination device according to the first embodiment. The second light emission intensity LS2 calculated by the light emission intensity calculator 115 potentially exceeds the upper limit value of the drive current to the light source 4 in a region where the irradiation area AR is relatively large, depending on, for example, the size of the first light emission intensity LS1 transmitted from the control device 200.

In the illumination device 1 according to the present embodiment, the light emission intensity limitation value LS_lim not exceeding the upper limit value of the drive current to the light source 4 is held in the storage 118, and the light emission intensity limiter 116 outputs the light emission intensity LS obtained by limiting the upper limit of the second light emission intensity LS2 to the light emission intensity limitation value LS_lim illustrated in FIG. 22. Accordingly, relative brightness can be kept substantially constant when the light distribution angle is changed.

Figure 23A:
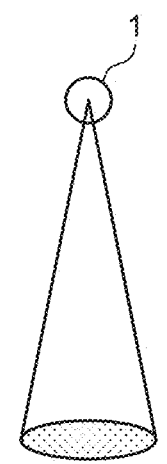
FIG. 23A is a first schematic diagram illustrating the relation between the irradiation region and illuminance of light from an illumination device 1 according to the first embodiment.
Figure 23B:
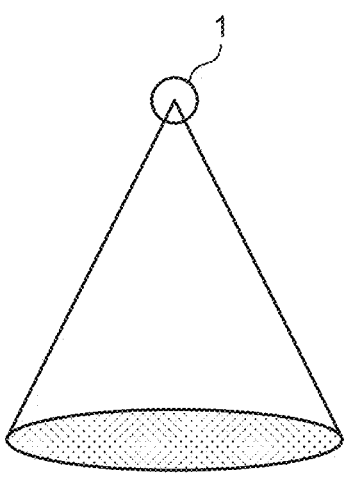
FIG. 23B is a second schematic diagram illustrating the relation between the irradiation region and illuminance of light from the illumination device 1 according to the first embodiment.
Figure 23C:
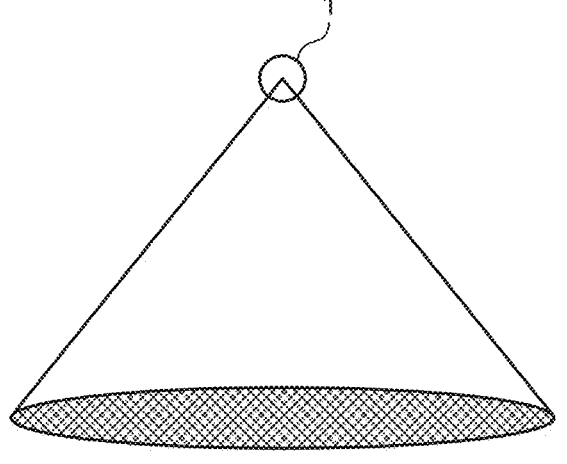
FIG. 23C is a third schematic diagram illustrating the relation between the irradiation region and illuminance of light from the illumination device 1 according to the first embodiment.

FIG. 23A is a first schematic diagram illustrating the relation between the irradiation region and illuminance of light from the illumination device 1 according to the first embodiment. FIG. 23B is a second schematic diagram illustrating the relation between the irradiation region and illuminance of light from the illumination device 1 according to the first embodiment. FIG. 23C is a third schematic diagram illustrating the relation between the irradiation region and illuminance of light from the illumination device 1 according to the first embodiment.

In a region where the light emission intensity LS is not limited to the light emission intensity limitation value LS_lim, relative brightness is kept substantially constant when the light distribution angle is changed as illustrated in FIGS. 23A and 23B.

In a region where the light emission intensity LS is limited to the light emission intensity limitation value LS_lim, brightness decreases as the irradiation region is larger as illustrated in FIG. 23C since the drive current to the light source 4 is prevented from exceeding the upper limit value.

As described above, the illumination device 1 according to the present embodiment holds, in the storage 118, information indicating the correspondence relation between the irradiation area AR and the light emission intensity multiplier K and calculates the light emission intensity based on the information. Then, the illumination device 1 limits the light emission intensity so that the upper limit value of the drive current to the light source 4 is not exceeded, and supplies the drive current to the light source 4.

Thus, relative brightness can be keep substantially constant when the light distribution angle is changed in a region where the drive current to the light source 4 does not exceed the upper limit value, and accordingly, the illumination device 1 that is highly convenient is obtained.

Second Embodiment

Figure 24:
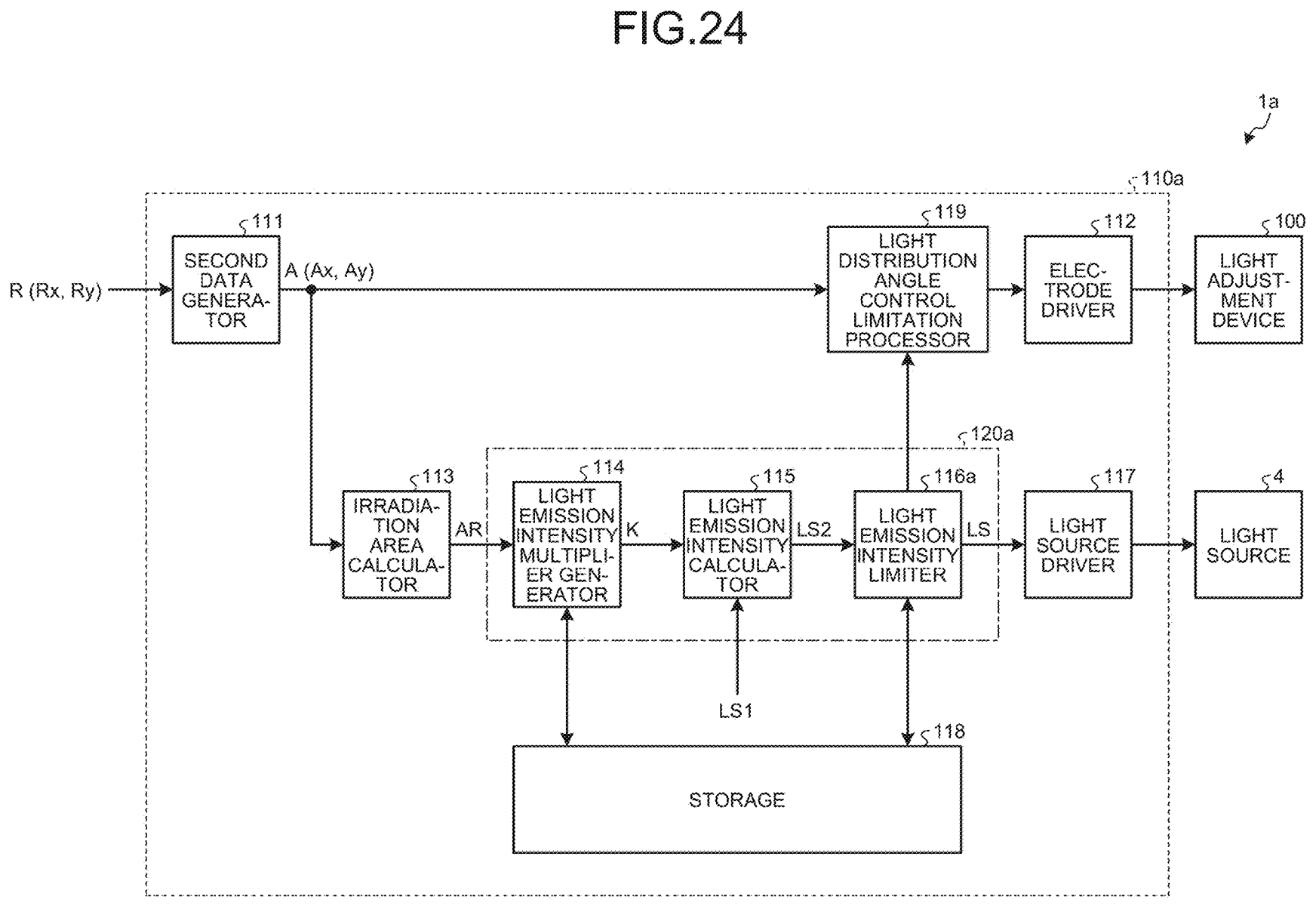

FIG. 24 is a diagram illustrating an example of a control block configuration of an illumination device according to a second embodiment. A controller 110a of an illumination device 1a according to the second embodiment includes a light distribution angle control limitation processor 119 in addition to the configuration of the first embodiment.

In the present embodiment, a light emission intensity limiter 116a of a light emission intensity generator 120a outputs, to the light distribution angle control limitation processor 119, a light distribution angle adjustment feasibility command indicating whether the second light emission intensity LS2 calculated by the light emission intensity calculator 115 is smaller than the light emission intensity limitation value LS_lim.

The light distribution angle control limitation processor 119 holds the light distribution angle A(Ax, Ay) in the previous processing of light distribution angle control limitation processing described below (hereinafter also referred to as "the previous value of the light distribution angle A(Ax, Ay)"). The previous value of the light distribution angle A(Ax, Ay) may be stored in the storage 118.

Figure 25:
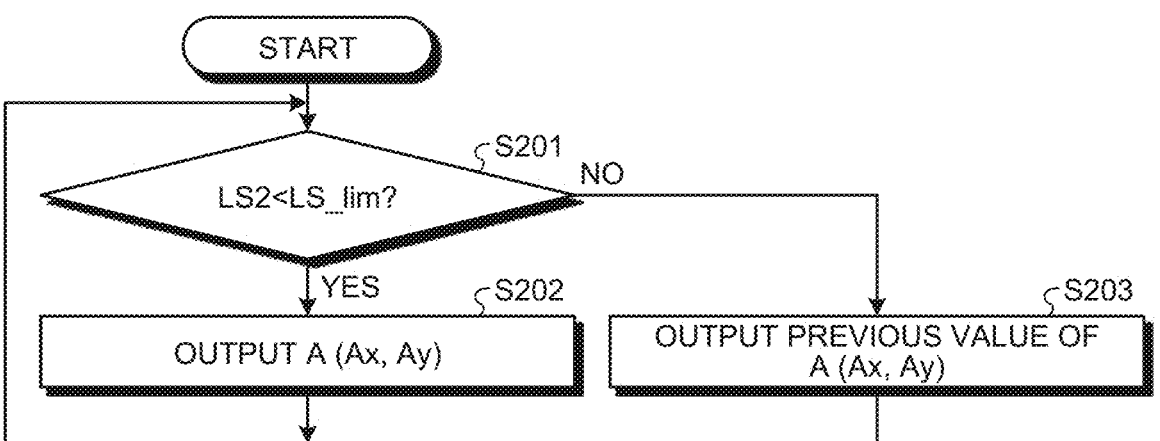
FIG. 25 is a flowchart illustrating an example of light distribution angle control limitation processing at the illumination device according to the second embodiment.

The light distribution angle control limitation processor 119 outputs the previous value of the light distribution angle A(Ax, Ay) to the electrode driver 112 in a region where the light emission intensity LS is limited to the light emission intensity limitation value LS_lim, in other words, a region where the second light emission intensity LS2 is equal to or larger than the light emission intensity limitation value LS_lim. Accordingly, adjustment control of the light distribution angle of the light adjustment device 100 is limited. FIG. 25 is a flowchart illustrating an example of the light distribution angle control limitation processing in the illumination device according to the second embodiment.

The light distribution angle control limitation processor 119 determines whether the second light emission intensity LS2 is smaller than the light emission intensity limitation value LS_lim (LS<LS_lim) based on the light distribution angle adjustment feasibility command (step S201).

When the second light emission intensity LS2 is smaller than the light emission intensity limitation value LS_lim (Yes at step S201), the light distribution angle control limitation processor 119 outputs, to the electrode driver 112, the light distribution angle A(Ax, Ay) output from the second data generator 111 (step S202), and returns to the processing at step S201.

When the second light emission intensity LS2 is equal to or larger than the light emission intensity limitation value LS_lim (No at step S201), the light distribution angle control limitation processor 119 outputs the previous value of the light distribution angle A(Ax, Ay) to the electrode driver 112 (step S203) and returns to the processing at step S201.

By the above-described light distribution angle control limitation processing, the light distribution angle control limitation processor 119 outputs the light distribution angle A(Ax, Ay) held when the second light emission intensity LS2 is smaller than the light emission intensity limitation value LS_lim, while the second light emission intensity LS2 is equal to or larger than the light emission intensity limitation value LS_lim. Accordingly, adjustment control of the light distribution angle by the light adjustment device 100 is not performed when the second light emission intensity LS2 is equal to or larger than the light emission intensity limitation value LS_lim.

As described above, in the illumination device 1a according to the present embodiment, the previous value of the light distribution angle A(Ax, Ay) is output to the electrode driver 112 when the second light emission intensity LS2 is equal to or larger than the light emission intensity limitation value LS_lim. Accordingly, relative brightness can be kept substantially constant when the light distribution angle is changed in a region where adjustment control of the light distribution angle by the light adjustment device 100 is not limited.

Third Embodiment

Figure 26:
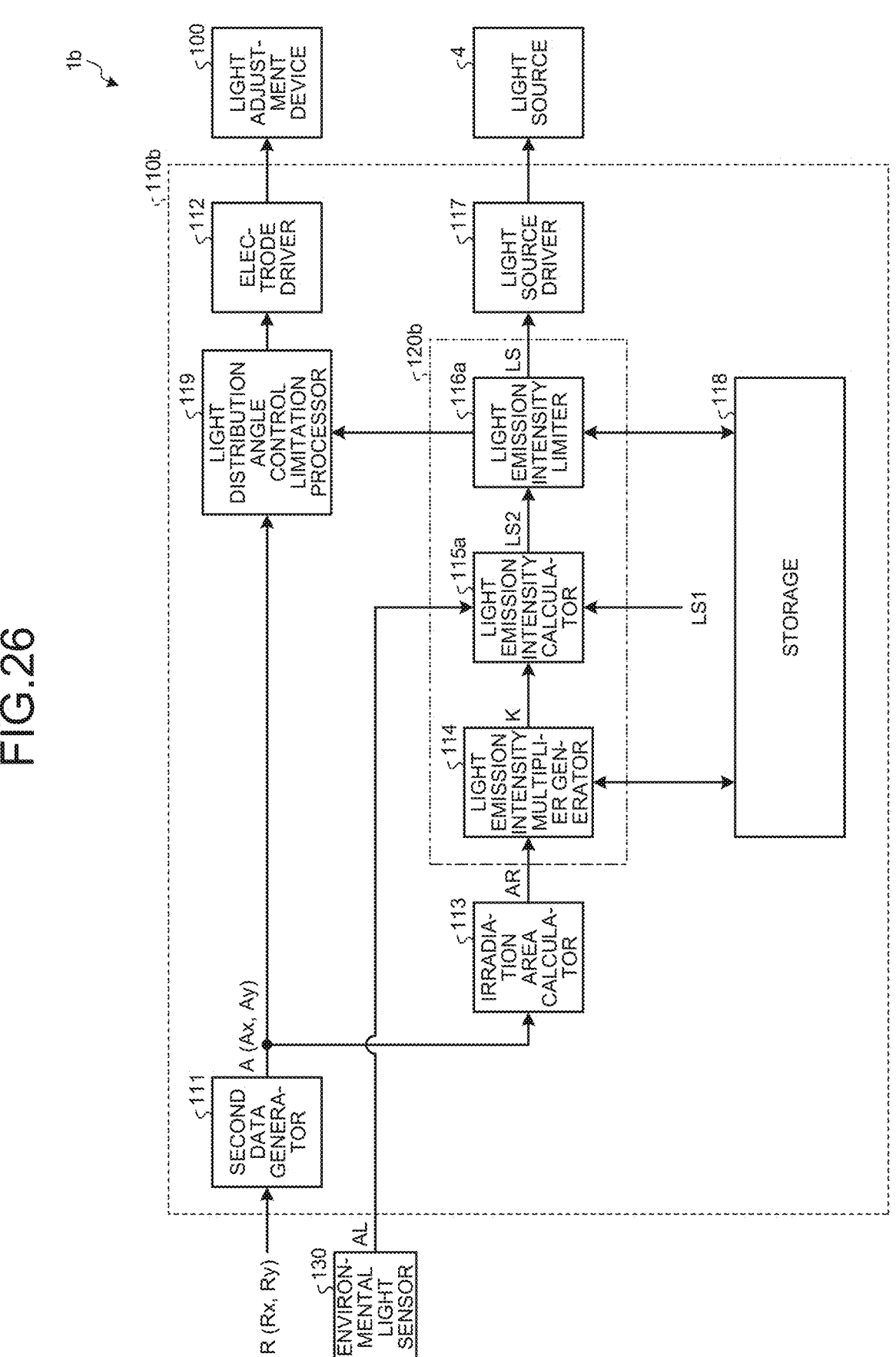
FIG. 26 is a diagram illustrating an example of a control block configuration of an illumination device according to a third embodiment.

FIG. 26 is a diagram illustrating an example of a control block configuration of an illumination device according to a third embodiment. An illumination device 1b according to the second embodiment includes an environmental light sensor 130 in addition to the configuration of the second embodiment. The environmental light sensor 130 is, for example, an illuminance sensor.

The environmental light sensor 130 detects environmental light AL in surroundings of the illumination device 1b.

In the present embodiment, the environmental light AL detected by the environmental light sensor 130 is input to a light emission intensity generator 120b of a controller 110b. A light emission intensity calculator 115a of the light emission intensity generator 120b calculates the second light emission intensity LS2 by adding a light emission intensity LS_base in accordance with the environmental light AL to a value obtained by multiplying the first light emission intensity LS1 by the light emission intensity multiplier K.

Accordingly, illuminance in the irradiation region can be adjusted to brightness in accordance with environmental light in surroundings of the illumination device 1b.

Figure 27A:
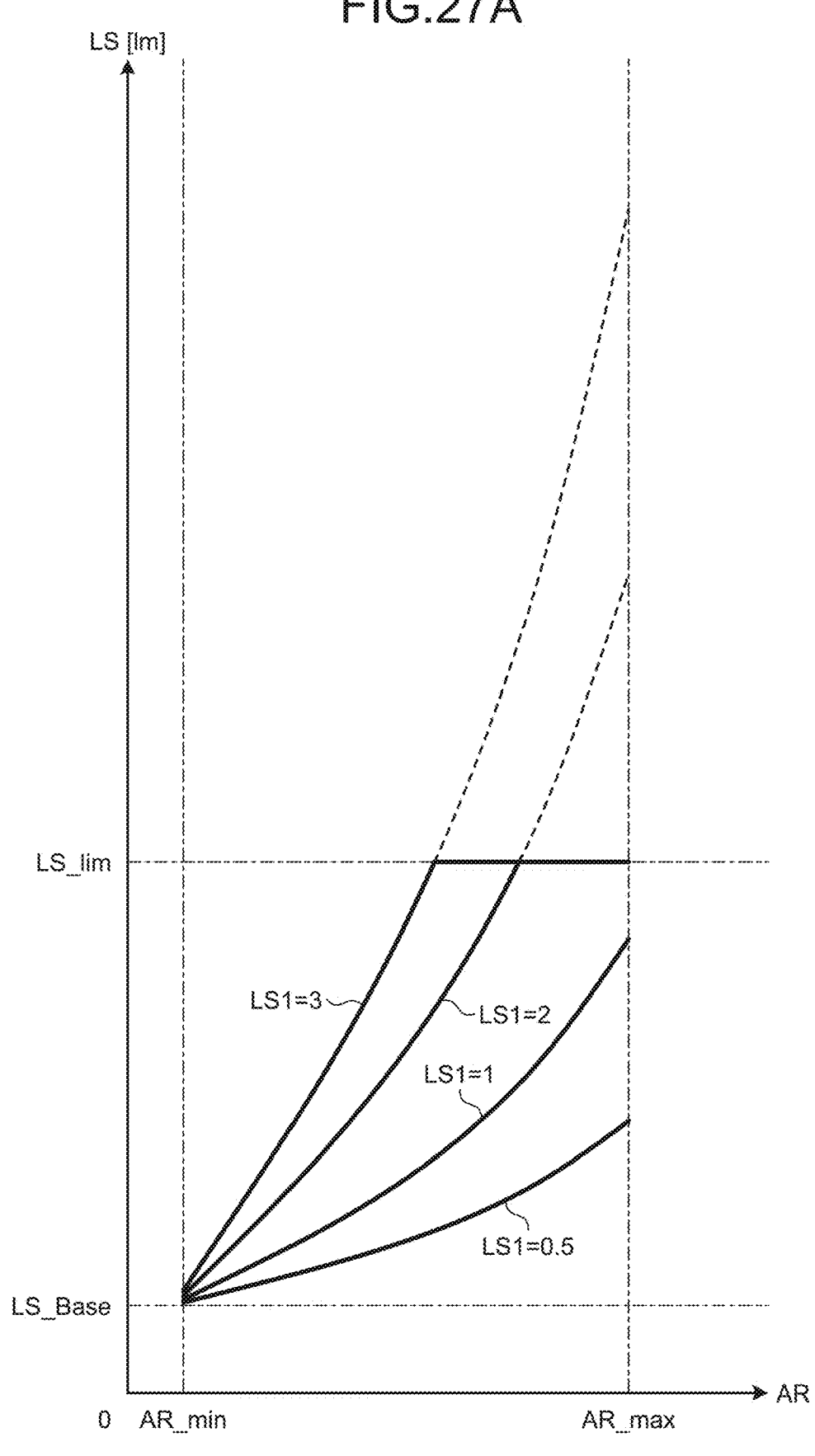
FIG. 27A is a line diagram illustrating a first example of the light emission intensity of the illumination device according to the third embodiment.
Figure 27B:
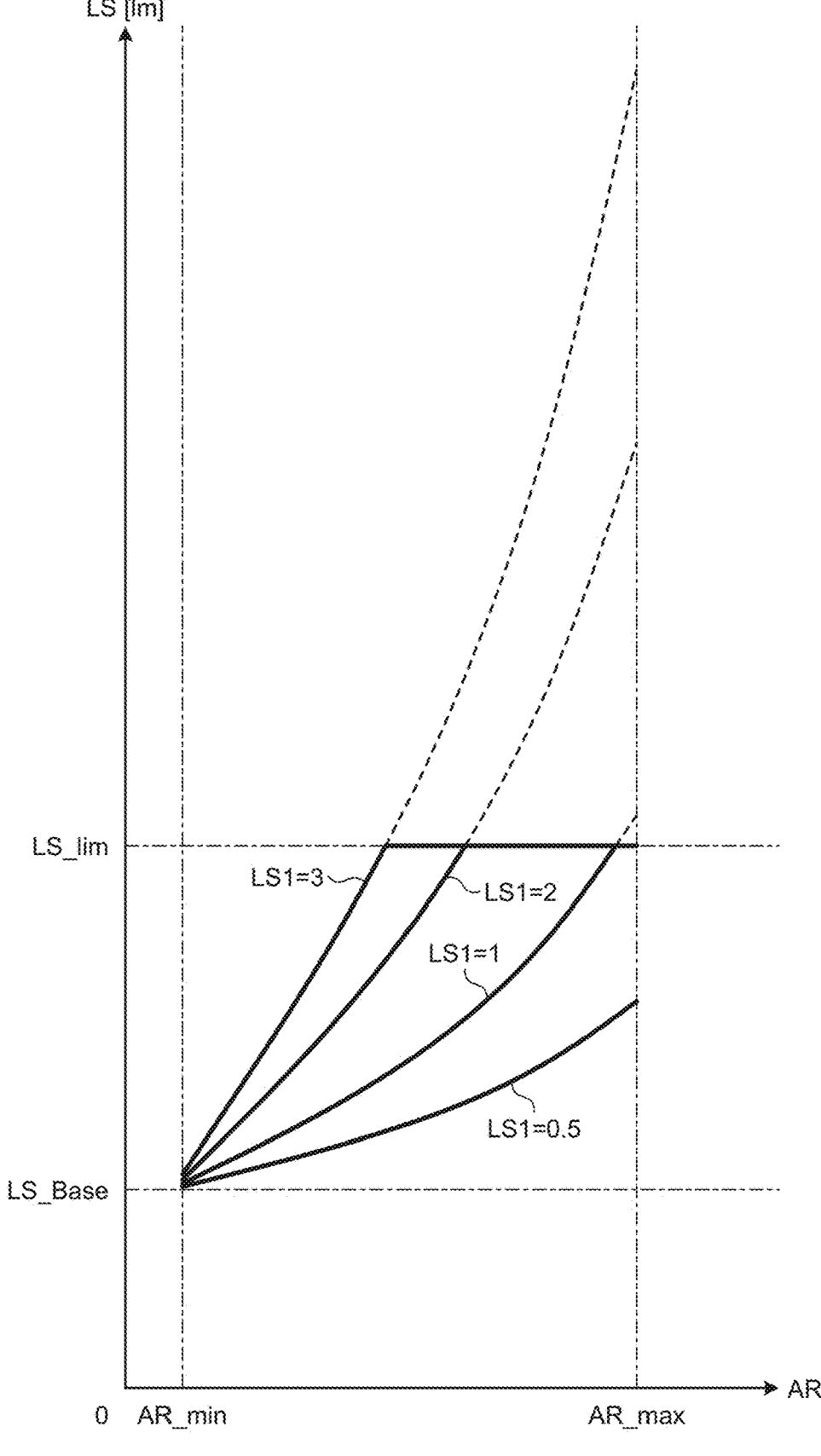
FIG. 27B is a line diagram illustrating a second example of the light emission intensity of the illumination device according to the third embodiment.

FIG. 27A is a line diagram illustrating a first example of the light emission intensity of the illumination device according to the third embodiment. FIG. 27B is a line diagram illustrating a second example of the light emission intensity of the illumination device according to the third embodiment.

As illustrated in FIGS. 27A and 27B, a region where the second light emission intensity LS2 is equal to or larger than the light emission intensity limitation value LS_lim changes in accordance with environmental light in surroundings of the illumination device 1b, and specifically, the region where the second light emission intensity LS2 is equal to or larger than the light emission intensity limitation value LS_lim is larger as surroundings of the illumination device 1b are brighter, but since the light distribution angle control limitation processor 119 described above in the second embodiment is provided, relative brightness can be kept substantially constant when the light distribution angle is changed in a region where adjustment control of the light distribution angle by the light adjustment device 100 is not limited.

The preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. An illumination device comprising:
   a light source;
   a light adjustment device configured to control a light distribution angle of light emitted from the light source; and
   a controller configured to control the light source and the light adjustment device, wherein
   the controller includes
      a storage configured to hold information indicating a correspondence relation between an irradiation area calculated based on a light distribution angle command value and an irradiation area ratio to a predetermined reference irradiation area,
      a light emission intensity generator configured to generate light emission intensity of the light source based on the information, and
      a driver configured to drive the light source based on the light emission intensity.

2. The illumination device according to claim 1, wherein the light emission intensity generator includes
   a light emission intensity multiplier generator configured to generate a light emission intensity multiplier relative to a reference light emission intensity at a predetermined reference light distribution angle based on the information, and a light emission intensity calculator configured to calculate a second light emission intensity obtained by multiplying a first light emission intensity by the light emission intensity multiplier.

3. The illumination device according to claim 2, wherein the reference light distribution angle is a minimum value of a control range of the light distribution angle of the light adjustment device.

4. The illumination device according to claim 2, wherein the irradiation area ratio and the light emission intensity multiplier have a same value.

5. The illumination device according to claim 2, wherein the light emission intensity generator further includes a light emission intensity limiter configured to limit an upper limit value of the second light emission intensity to a predetermined light emission intensity limitation value and output the second light emission intensity to the driver.

6. The illumination device according to claim 5, wherein the controller includes a light distribution angle control limitation processor configured to limit light distribution angle control of the light adjustment device when the second light emission intensity is equal to or larger than the light emission intensity limitation value.

7. The illumination device according to claim 2, further comprising an environmental light sensor configured to detect environmental light in surroundings, wherein the light emission intensity calculator calculates the second light emission intensity in accordance with a value detected by the environmental light sensor.

\* \* \* \* \*